US008532925B2

(12) United States Patent
Motoyama

(10) Patent No.: US 8,532,925 B2
(45) Date of Patent: Sep. 10, 2013

(54) SPATIAL INDEXING METHOD AND APPARATUS FOR NAVIGATION SYSTEM FOR INDEXING AND RETRIEVAL OF XML MAP DATA

(75) Inventor: Masaki Motoyama, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 445 days.

(21) Appl. No.: 12/387,904

(22) Filed: May 8, 2009

(65) Prior Publication Data
US 2010/0287207 A1 Nov. 11, 2010

(51) Int. Cl.
*G08G 1/0968* (2006.01)
(52) U.S. Cl.
USPC ............. 701/461; 707/920; 701/25; 701/409
(58) Field of Classification Search
USPC .......................... 701/201, 202, 213; 707/724
See application file for complete search history.

(56) References Cited

U.S. PATENT DOCUMENTS

| 5,953,722 | A | 9/1999 | Lampert et al. | |
|---|---|---|---|---|
| 6,421,606 | B1 * | 7/2002 | Asai et al. | 701/209 |
| 7,099,882 | B2 | 8/2006 | McDonough | |
| 7,266,560 | B2 | 9/2007 | Lampert et al. | |
| 7,437,240 | B2 * | 10/2008 | Oumi et al. | 701/209 |
| 7,725,425 | B2 * | 5/2010 | Smartt | 707/770 |
| 7,747,598 | B2 * | 6/2010 | Buron et al. | 707/705 |
| 2005/0102101 | A1 * | 5/2005 | Beesley et al. | 701/209 |
| 2007/0185651 | A1 * | 8/2007 | Motoyama et al. | 701/211 |
| 2008/0016037 | A1 * | 1/2008 | Enomoto et al. | 707/3 |
| 2008/0104532 | A1 * | 5/2008 | Stambaugh | 715/771 |
| 2008/0109761 | A1 * | 5/2008 | Stambaugh | 715/853 |
| 2008/0133579 | A1 * | 6/2008 | Lim | 707/102 |
| 2010/0145936 | A1 * | 6/2010 | Grinstein et al. | 707/724 |
| 2010/0262359 | A1 * | 10/2010 | Motoyama | 701/200 |

OTHER PUBLICATIONS

Banerjee et al., Fast FPGA Placement Using Space-Filling Curve (2005 IEEE), pp. 415-420.*

* cited by examiner

*Primary Examiner* — Sangwoo Ahn
(74) *Attorney, Agent, or Firm* — Muramatsu & Associates

(57) ABSTRACT

A method and apparatus efficiently assigns the spatial index numbers to map cells that divide an area which is a unit of administrative region into a plurality of small units. The method includes the steps of: establishing a plurality of map cells that divide an administrative region expressed by XML map data which is configured in a multiple-layered structure; determining a layer in the XML map data on which the map cells are established; selecting a type of tracing curve for sequentially indexing the plurality of map cells; assigning index numbers consecutively to the map cells with the sequence of the tracing curve; and repeating foregoing steps for all of the map cells in all of the layers of the XML map data, thereby creating a map database in the XML format with the spatial indexes for all of the map cells.

7 Claims, 25 Drawing Sheets

⊣ Local Cluster
○ Boundary Node

Fig. 6

| 21 | 23 | 29 | 31 | 53 | 55 | 61 | 63 |
|----|----|----|----|----|----|----|----|
| 20 | 22 | 28 | 30 | 52 | 54 | 60 | 62 |
| 17 | 19 | 25 | 27 | 49 | 51 | 57 | 59 |
| 16 | 18 | 24 | 26 | 48 | 50 | 56 | 58 |
| 5  | 7  | 13 | 15 | 37 | 39 | 45 | 47 |
| 4  | 6  | 12 | 14 | 36 | 38 | 44 | 46 |
| 1  | 3  | 9  | 11 | 33 | 35 | 41 | 43 |
| 0  | 2  | 8  | 10 | 32 | 34 | 40 | 42 |

Fig. 7A

```
<g id="LineFourth Class Road">
    <g id="Line Seg">
        <path id="218899" stroke="rgb(25,0, 88)" stroke-width="9" d="M
-7401247,-4070676 -7401306,-4070605 -7401326,-4070584"/>
        <path id="218900" stroke="rgb(25,0, 88)" stroke-width="9" d="H
-7401326, -4070584 -7401347, -4070563"/>
        <path id="219019" stroke="rgb(25,0, 88)" stroke-width="9" d="M
-7400990, -4070975 -7401044, -4070912"/>
            <mbr id="R2">
            -7401247,-4070676
            -7401044,-4070912 />
            <SpaceFilling Level=' 3T >
            4 6,7 12,13 />
    /g>
/g>
```

Fig. 7B

```
<g id="Area Park">
    <g id="1234" name="Central Park">
        <path fill="rgb(190,190, 80)" stroke="none" d="M
        -7393904, -4078036
        -7393892, -4078032
        -7393875, -4078055
        -7393884, -4078070" />
        <mbr id="R1">
        -7393904, -4078036
        -7393852, -4076070 />
        <SpaceFilling Level=' 3' >
        49 51 54 57 59,60 />
    /g>
/g>
```

Fig. 8A

| Yi \ Xi | 0000 | 0001 | 0010 | 0011 |
|---|---|---|---|---|
| 1111 | 01010101 (85) | 01010111 (87) | 01011101 (93) | 01011111 (95) |
| 1110 | 01010100 (84) | 01010110 (86) | 01011100 (92) | 01011110 (94) |
| 1101 | 01010001 (81) | 01010011 (83) | 01011001 (89) | 01011011 (91) |
| 1100 | 01010000 (80) | 01010010 (82) | 01011000 (88) | 01011010 (90) |
| 1011 | 01000101 (69) | 01000111 (71) | 01001101 (77) | 01001111 (79) |
| 1010 | 01000100 (68) | 01000110 (70) | 01001100 (76) | 01001110 (78) |
| 1001 | 01000001 (65) | 01000011 (67) | 01001001 (73) | 01001011 (75) |
| 1000 | 01000000 (64) | 01000010 (66) | 01001000 (72) | 01001010 (74) |
| 0111 | 00010101 (21) | 00010111 (23) | 00011101 (29) | 00011111 (31) |
| 0110 | 00010100 (20) | 00010110 (22) | 00011100 (28) | 00011110 (30) |
| 0101 | 00010001 (17) | 00010011 (19) | 00011001 (25) | 00011011 (27) |
| 0100 | 00010000 (16) | 00010010 (18) | 00011000 (24) | 00011010 (26) |
| 0011 | 00000101 (5) | 00000111 (7) | 00001101 (13) | 00001111 (15) |
| 0010 | 00000100 (4) | 00000110 (6) | 00001100 (12) | 00001110 (14) |
| 0001 | 00000001 (1) | 00000011 (3) | 00001001 (9) | 00001011 (11) |
| 0000 | 00000000 (0) | 00000010 (2) | 00001000 (8) | 00001010 (10) |

Fig. 8B (Xi, Yi) = (X4, Y4, X3, Y3, X2, Y2, X1, Y1)
Xi = X4, X3, X2, X1
Yi = Y4, Y3, Y2, Y1

Fig. 12A
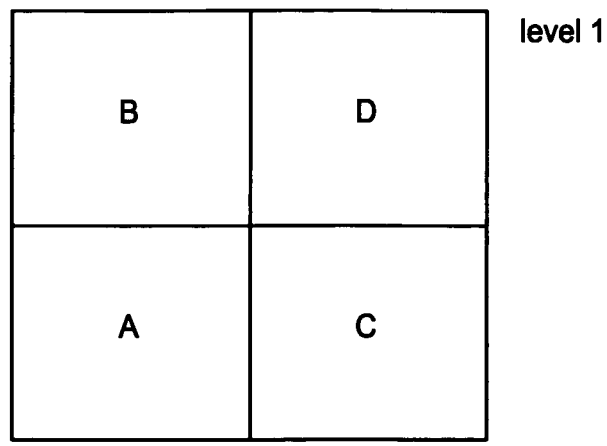
level 1
Fig. 12B
level 2
Fig. 12C
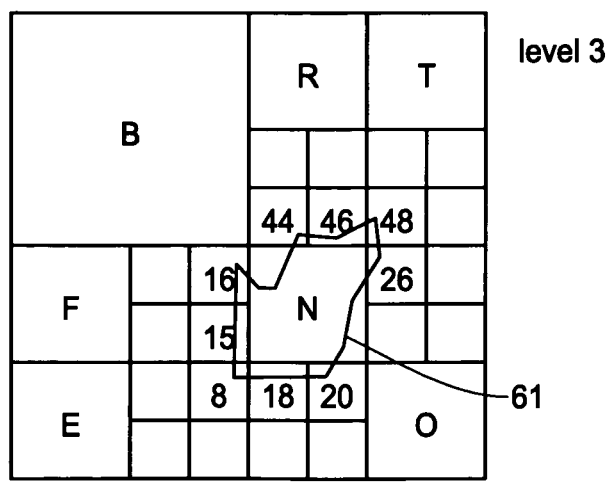
level 3

Fig. 13A
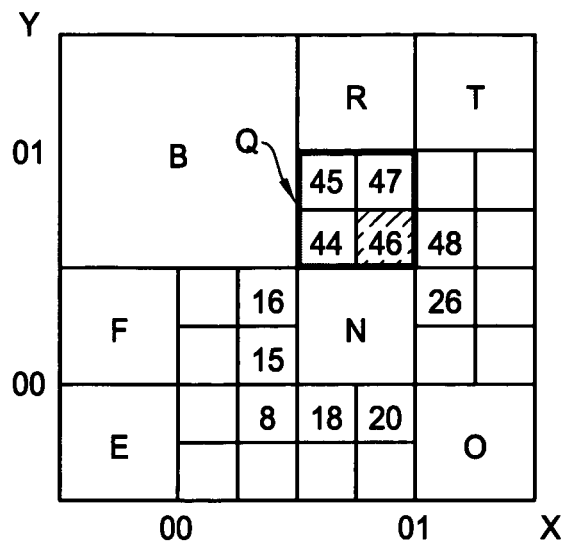
Fig. 13B
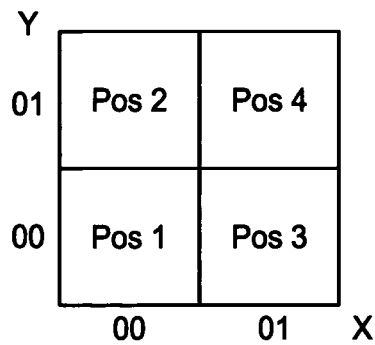
Fig. 13C
| axis \ level | 1 | 2 | 3 | |
|---|---|---|---|---|
| X | 1 | 0 | 1 | $(101)_2 = 5$ |
| Y | 1 | 0 | 0 | $(100)_2 = 4$ |

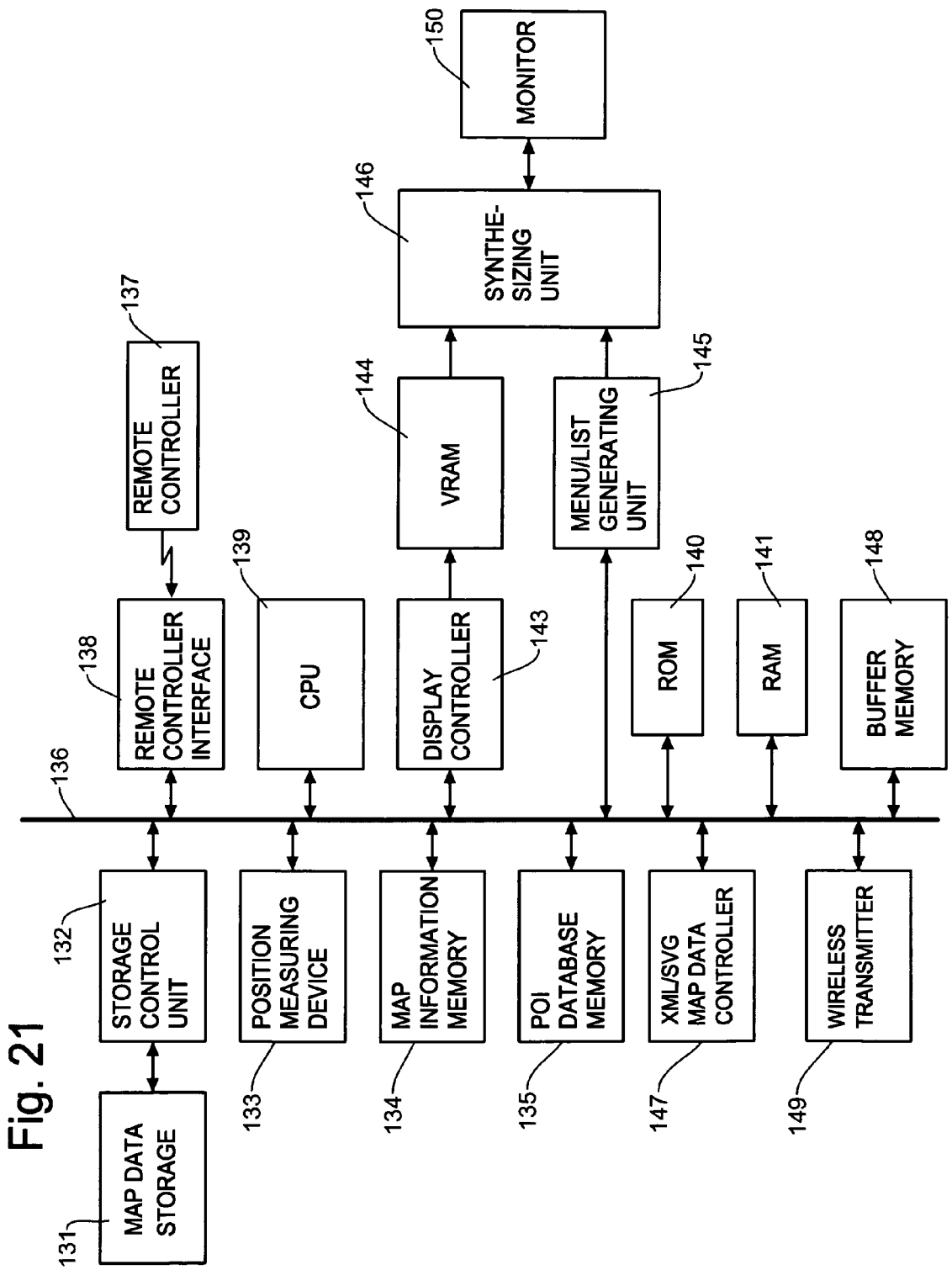

SPATIAL INDEXING METHOD AND APPARATUS FOR NAVIGATION SYSTEM FOR INDEXING AND RETRIEVAL OF XML MAP DATA

FIELD OF THE INVENTION

This invention relates generally to an indexing and searching map data in the XML format, and more particularly, to a method and apparatus for a navigation system for spatial indexing the XML navigation map data and searching of a map area with small map cells based on the spatial indexing by means of space tracing curves such that a multi-layer structure of the map data can be used and two dimensional data can be handled as one dimensional data for indexing and addressing the map cells.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, the navigation system notifies the user which direction to turn at the intersection.

In such an application of navigation system for handling the map data, spatial indexes are used in the map databases to optimize organization of the map data or searching a map area from the map data. Typically, square or rectangular meshes are used to divide, index, and store all of the geographic objects, such as roads, bridge, river, etc. in the map data. As shown in FIG. 1A, the map data of the selected area is divided into a plurality of meshes or map cells. In this example, a map area 23 is divided into a plurality of map cells 21a-21i each typically having a rectangular shape of a predetermined size.

When a destination is set, a navigation system retrieves and processes the map data to produce a calculated route, which is an optimum route to the destination determined by predefined methods. During a route guidance operation to the destination, the navigation system successively retrieves the map data associated with the calculated route from the data storage medium and stores such map data in a map memory and reads the map data in the map memory for conducting the route guidance operation. The map data for the navigation system must include a large amount of information such as road shapes, links, absolute locations, road classes, allowable speeds and other traffic regulations, POI (point of interest) information, POI icons, map icons, etc. Thus, the process of storing, retrieving, and processing such a large amount of map data can be time consuming and needs a high processing power of the navigation system.

In order to resolves such burdens, in addition to the map cells noted above, the map data used for a navigation system is typically structured in a multiple layer. FIG. 1B is a schematic diagram showing an example of such a multiple layer data format of the map data used in the navigation system. As shown, the format of the map data in FIG. 1B is configured by a plurality of layers 11A-11D each representing a part of the map data to be stored in a map data storage or a map database of the navigation system.

Further, as noted above, the map data in each of the layers 11A-11D are divided into a plurality of meshes or map cells represented by reference numerals 13A-13D. Namely, the map data is hierarchically layered corresponding to the level of details of the map information as well as divided into the map cells corresponding to the predetermined size or amount of the map data. In the example of FIG. 1B, the higher the layer of the hierarchy, the lower the detailedness of the map information and the larger the mesh (map cell) size which is equivalent to the covering area.

Typically, the higher layer represents only high class roads, for example, interstate highway, freeway, etc. while the lower layer represents low class roads, i.e., residential roads, etc., POI icons, building foot prints, etc., in addition to that represented by the higher layers. One of the reasons for using the layered structure is to accommodate several different map scales for enlarging or shrinking the map image on the display screen on the navigation system. Since the lower layer includes more detailed map information, the size of the meshes 13A-13D (covering area) is smaller than that of the higher layer to maintain the amount of map data within a predetermined range.

Since the map data is treated as a unit of mesh (map cell) 13 as shown in FIG. 1B, the navigation system does not have to process an excessively large amount of map data at a time. Namely, the navigation system processes the map data corresponding to each unit of the mesh on the corresponding layer. The layer 11A shown in FIG. 1B is comprised of one mesh 13A while the layer 11B is comprised of four meshes 13B, and the layer 11C is comprised of eight meshes 13C while the layer 11D is comprised of sixteen meshes 13D. Each layers 11A-11D and meshes 13A-13D in the map data are indexed and stored in the map database so that the desired map data in the unit of mesh (map cell) will be retrieved by specifying one or more indexes.

Thus, the performance limitation that may be caused by the hardware power of the navigation system can be alleviated by maintaining the map data within the suitable size. However, this configuration of the map data and its indexing is inflexible in handling the map data. Moreover, the map data in the mesh form for each scale factor is also required. For instance, four layers of map data may be required for each scale factor for a zoomed-in view to a zoomed-out view. The amount of memory to read and the load to the disk input and output can also be significant. Extraction of map data based on a jurisdiction basis, such as city or county, is not possible or would be complex.

To overcome this problem, another patent application by the same applicant of this invention proposes a method and apparatus for route search for a navigation system using map data in an XML format (XML map data). In the application, it is proposed that the XML map data is organized as a unit of administrative region such as a city, county, state, etc. Although the XML map data treated as a unit of administrative region is useful, there arises a situation where the map data as the unit of administrative region is too large for processing the detailed information within an administrative region or a boardering area between two or more administrative regions. Thus, it is desired to improve the usability of the navigation system using the XML map data by further dividing the XML map data of the administrative region into small map cells with a unique indexing method.

SUMMARY OF THE INVENTION

It is, therefore, an object of the present invention to provide a method and apparatus for spatially indexing the map cells that divide an area which is a unit of administrative region into a plurality of small units for a navigation system utilizing the XML format map data with a multiple-layered structure.

It is another object of the present invention to provide a method and apparatus for efficiently assigning the spatial index numbers to the map cells that divide an area which is a unit of administrative region into a plurality of small units for a navigation system utilizing the XML map data with a multi-layered structure.

It is a further object of the present invention to provide a method and apparatus for efficiently assigning the spatial index numbers to the map cells that divide an area which is a unit of administrative region into a plurality of small units of XML map data with a predetermined sequence created by combining two dimensional X-Y axis data into one dimensional data.

It is a further object of the present invention to provide a method and apparatus for efficiently assigning the spatial index numbers to the map cells that divide an area which is a unit of administrative region into a plurality small cell so that the map data that is actually necessary is efficiently retrieved and processed by the resources of the navigation system.

One aspect of the present invention is a method of spatial indexing a plurality of map cells and retrieving map data from the map cells for a navigation system utilizing XML map data. The method includes the steps of: establishing a plurality of map cells for spatial indexing where the map cells divide an administrative region expressed by XML map data into small units where the XML map data is configured in a multiple-layered structure; determining a layer in the multiple-layered structure of the XML map data on which the map cells are established for the spatial indexing; selecting a type of tracing curve for sequentially indexing the plurality of map cells that divide the administrative regions; assigning index numbers consecutively to the plurality of map cells with the sequence determined by the selected tracing curve; and repeating foregoing steps for all of the map cells in all of the layers of the XML map data, thereby creating a map database in the XML format with the spatial indexes for all of the map cells.

The method of the present invention further includes a step of selecting the map cells by generating address data that correspond to the index numbers assigned to the map cells for retrieving the XML map data from the map database.

In the method of the present invention, the sequence of the tracing curve for indexing the map cells is created by combining X-address data and Y-address data of the map cells into one dimensional data. For example, the sequence of the tracing curve for indexing the map cells is created by combining X-address data $X_i$ and Y-address data $Y_i$ into one dimensional data $(X_i, Y_i): X_i \, \Omega \, Y_i \rightarrow \text{Value } (X3 \, Y3 \, X2 \, Y2 \, X1 \, Y1 \, X0 \, Y0)_n$ binary bit integer. The tracing curve is an N-shape curve or a U-shape curve.

The method of the present invention further includes a step of providing cost information on virtual links that connect boundary nodes on the administrative regions on layers higher than a base layer in the layered structure of the XML map data, and a step of providing cost information on physical links on the base layer of the layered structure of the XML map data.

The method of the present invention further includes a step of searching routes between a start point and a destination when the destination is specified by a user by selecting candidate virtual links that connect the boundary nodes of different administrative regions on a particular layer of the map data by evaluating the cost information on the virtual links.

The cost information is computed based on a distance, a travel time, and predetermined cost space factors for each virtual link and physical link where the cost information on the virtual links on a particular layer is established on a layer of the map data that is immediately higher than the particular layer and stored in a form of cost tables.

In the method of the present invention, the administrative regions include cities, counties, states, and countries in the order of lower layer to higher layer in the layered structure of the XML map data. More specifically, the layered structure of the XML map data is configured by an international layer for connecting the boundary nodes between two or more countries, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

Another aspect of the present invention is an apparatus for efficiently indexing the map cells and retrieving the map data from the map cells for implementing the steps defined in the methods of the present invention noted above. The apparatus includes various means to assign the index numbers to the map cells and selects the map cells to retrieve the XML map data therefrom. The apparatus is able to improve the efficiency and operability of the navigation system using the XML format map data constructed in a layered structure based on administrative areas or jurisdictions by dividing the XML map data into a plurality of small map cells so that the XML map data that is actually necessary is retrieved and processed by the resources of the navigation system.

According to the present invention, the method and apparatus efficiently assigns the spatial index numbers to the map cells that divide an area which is a unit of administrative region into a plurality of small units for a navigation system utilizing XML map data with a multi-layered structure. The index numbers for the map cells are assigned with a predetermined sequence created by combining two dimensional (X-Y) axis data into one dimensional data. The predetermined sequence includes the N-shape trace and U-shape trace for generating the sequence of the index numbers or address data with respect to the map cells. According to the present invention, the navigation system is able to efficiently index the plurality of small map cells that divide the XML map data in the unit of administrative region and retrieves the map data from the map cells. Since the XML map data is retrieved and processed as a unit of small map cell rather than a large unit of administrative region, the map data that is actually necessary is retrieved and processed by the limited resources of the navigation system, it is possible to significantly improve the operability and performance of the navigation system.

BRIEF DESCRIPTION OF THE DRAWINGS

FIG. 2A shows a layered structure of the map data of XML format in which the map data is layered based on administrative regions for route search operations, and FIG. 2B shows map images of different levels from a country level to a city level by the XML map data.

FIG. 6 is a schematic diagram showing a plurality of map cells that partition the map data in the unit of administrative region and objects in the map cells to describe the relationship between the objects, map cells, and XML descriptions based on the spatial indexing method of the present invention.

FIGS. 7A and 7B are schematic diagrams showing an example of XML descriptions representing the road structure and the object shown in FIG. 6 with respect to the spatial indexing method of the present invention.

FIG. 8A is a table showing an example of sequentially indexing or assigning index numbers to the map cells under the spatial indexing method of the present invention where the indexing method utilizes a special tracing curve for indexing the map cells, and FIG. 8B shows the procedure in a generic form to alternately combine each bit of the X-axis bit Xi and Y-axis bit Yi for creating the one dimensional data (Xi, Yi) for the indexing.

FIGS. 9A and 9B are schematic diagrams showing how an X-axis and a Y-axis of geographic area are combined to create a one-dimensional sequence data for indexing the map cells by an N-shape curve or trace in accordance with the spatial indexing method of the present invention.

FIGS. 12A-12C are schematic diagrams showing examples of map cells from the levels 1 to 3 corresponding to the tree structure shown in FIG. 11 in accordance with the spatial indexing method of the present invention where FIG. 12A shows the map cells in the level 1, FIG. 12B shows the map cells in the level 2, and FIG. 12C shows the map cells in the level 3.

FIG. 13A is a schematic diagram showing the map cells similar to that in FIG. 12C except that an object is omitted and a map cell is highlighted, and FIG. 13B shows a simplified view of a particular map cell that is divided into four smaller map cells, and FIG. 13C shows a table indicating the values of the map cell.

FIGS. 14A-14D are schematic diagrams showing an example of indexing method of the present invention in which a U-curve trace is used for spatial indexing the map cells, where FIG. 14A shows an image of the U-curve trace in which the U-curve is sequentially connected along the indexing numbers, FIG. 14B shows the map cells and their index numbers based on the U-curve trace of the present invention, FIG. 14C shows various areas with different layers based on the indexing of FIGS. 14A and 14B, and FIG. 14D shows three different areas expressed by hatches based on the indexing of FIGS. 14A and 14B.

FIG. 21 is a block diagram showing an example of configuration of a vehicle navigation system implementing the present invention utilizing the XML map data and the spatial indexing method.

DETAILED DESCRIPTION OF THE PREFERRED EMBODIMENT

The spatial indexing method and apparatus of the present invention will be described in more detail with reference to the accompanying drawings. The spatial indexing method and apparatus of the present invention is advantageously applied to a navigation system for indexing and retrieving map data in the format of an extensible markup language (XML) and scalable vector graphics (SVG). It should be noted that although the present invention will be described for the case where the spatial indexing method is implemented to a vehicle navigation system, the present invention can be implemented to any other systems for indexing and searching the map data for a navigation purpose.

An XML is an extensible markup language that has been standardized and is gaining acceptance for many types of applications. Further, the XML is a markup language that is easy to read as it uses human-readable tags to describe the data. The extensible language allows programmers to define new description forms by specifying what the new syntax looks like. This allows a structured data format which is easily recognizable and modifiable.

An SVG is a type of mark-up language for describing graphic images using XML syntax. In other words, the SVG is a mark-up language designed after XML syntax used to create vector graphics for display on computer systems. The SVG can include geometric forms such as lines, points, polygons, curves, circles, as well as text and embedded images. The mark-up language allows to embed arbitrary contents therein more freely compared to the conventional data format. Hereafter, the map data in the format of XML and/or SVG is referred to as "XML map data".

In another patent application by the same applicant which is directed a method and apparatus for route search for a navigation system using the XML map data, it is proposed that the XML map data is organized as a unit of administrative region such as a city, county, state, etc. The spatial indexing method of the present invention is to improve usability of the navigation system utilizing the XML map data by dividing the XML map data of the administrative cluster into small map cells.

Figure 2A:
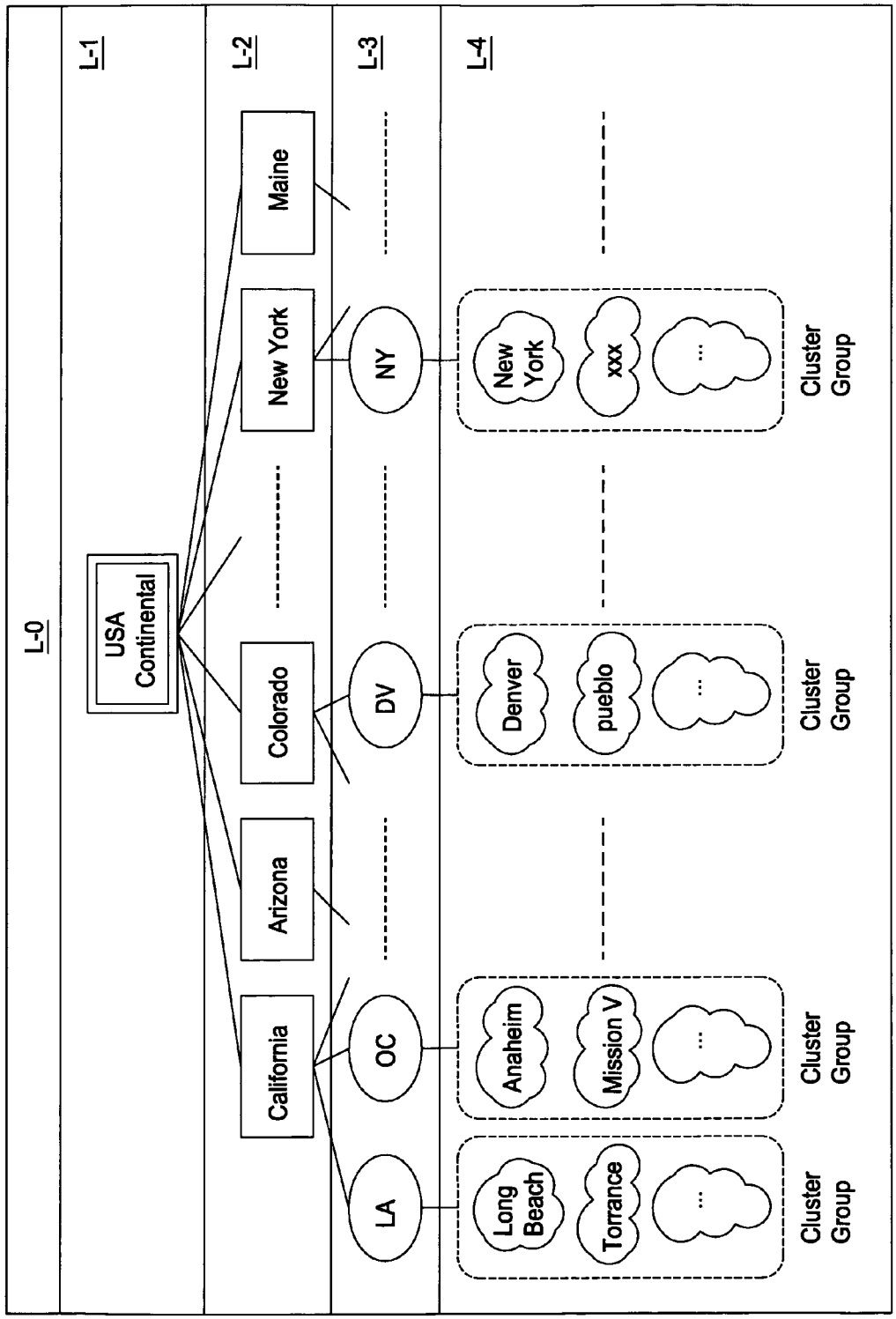
FIGS. 2A and 2B are schematic diagrams showing the basic concept of the XML format map data where

FIG. 2A shows an example of a layered structure of the XML map data incorporated in the route search method of the present invention. In this example, the XML map data is configured by five layers (administrative clusters) which are respectively referred to as an L-4 layer, an L-3 layer, an L-2 layer, an L-1 layer, and an L-0 layer. The L-4 layer describes the lowest or physical level (ex. city) of the XML map data, the L-3 layer is the next lowest level (ex. county), the L-0 layer describes the highest level (ex. world or international), the L-1 layer describes the next highest level (ex. country), and the L-2 layer describes the intermediate level (ex. state). The higher the level of administrative cluster, the larger the covered area with less details of routes and other map information.

The L-4 layer which is the lowest layer of the XML map data includes all of the road network data in the physical level for each cluster. As noted above, in the present invention, each cluster is an administrative region which is a city, county, state, and country. Thus, since it is the lowest layer, each cluster in the L-4 layer is organized as a unit of a city or a town with physical (actual) links rather than virtual links.

As shown in the example of FIG. 2A, the city of "Long Beach" and the city of "Torrance" are illustrated as separate clusters in the layer L-4. In FIG. 2A, the cities of "Long Beach", "Torrance", and other cities belong to the county of "Los Angeles", and the cities of "Anaheim", "Mission Viejo" and other cities belong to the county of "Orange". Since the counties are higher than the cities by one in the administrative level, the map data of the counties are on the layer L-3.

As will be described later, each cluster has boundary nodes on a cluster boundary (boundary of administrative region) where such boundary nodes are actual nodes of roads at the boundary of a city, county, etc. The layers higher than the L-4 level has a cost table for evaluating costs of each of virtual links connecting the boundary nodes of two or more clusters in the lower layer. For example, the XML map data in the county level (layer L-3) includes the cost tables regarding the virtual links connecting the boundary nodes of two or more cities (layer L-4) within the county for evaluating the costs of candidate virtual links.

Thus, the cost table is used to determine an optimum route between a start point and an end point (destination) through the cluster boundary nodes. The cost table is close ended in the XML map data of the corresponding cluster, which allows easy modification for quality improvement or data renewal.

The cost tables of each level are used for evaluating an overall cost of each virtual link connecting the boundary nodes based on distances, speeds (ex., road class), travel times, and other factors including current traffic condition.

Typically, a plurality of boundary nodes are established on the boundary of the cluster based on the road links and nodes in the map database. For example, in the layer L-4, since each cluster of administrative region represents a city, each city has city boundary nodes on the city boundary. In general, such city boundary nodes are cross points (nodes) of major roads between one city and another city adjacent to one another, i.e., the boundary nodes act as common nodes to the outside cluster.

Since the layer L-4 is the lowest layer, if both of a start point and a destination reside within the same cluster (city), an optimum route will be determined by directly evaluating the XML map data for the city since there is no boundary nodes involved in such a case. In contrast, if a start point and a destination are located in cities (administrative regions or clusters) different from one another, an optimum route will be determined by evaluating virtual links connecting the boundary nodes of the cities. For doing this, the XML map data of the L-3 layer which is an administrative region of county level include information (cost tables) to manage and evaluates virtual links for city level clusters that are located within the county.

The information in the cost tables is used for route calculation (cost evaluation) involving a route that crosses over two or more administrative clusters (cities), such as "Long Beach", "Torrance", etc., within a given county such as "Los Angeles" county via the boundary nodes on the city boundaries. The county layer L-3 includes boundary nodes on the boundary of each city in the county as well as on the boundary of the county itself which function as common nodes to adjacent counties. In addition to the cost tables for virtual links of city boundary nodes, the L-3 layer may also store cost tables for evaluating the costs of virtual links that directly connect the boundary nodes of the county.

The XML map data of the L-2 layer which is an administrative region of state level include information (cost tables) to manage county level clusters that are located within the state. The information is used for route calculation (cost evaluation) involving a route that crosses over two or more administrative clusters (counties) such as "Los Angeles", "Orange", etc., within a given state such as "California" via the boundary nodes on the boundaries of such counties. The state level map data in the layer L-2 includes boundary nodes of the counties as well as boundary nodes of the state itself which also function as common nodes to adjacent states. In addition to the cost tables for virtual links of county boundary nodes, the L-2 layer may also store cost tables for evaluating the costs of virtual links that directly connect the state boundary nodes.

The XML map data of the L-1 layer which is an administrative region of country level include information (cost tables) to manage state level clusters that are located within the country. The information is used for route calculation (cost evaluation) involving a route that crosses over two or more administrative clusters (states) such as California, Arizona, etc., within the country such as the United States of America via the boundary nodes on the boundaries of such states. The country level map data in the layer L-1 includes boundary nodes of the states as well as boundary nodes of the country itself which also function as common nodes to adjacent countries. In addition to the cost tables for virtual links of state boundary nodes, the L-1 layer may also store cost tables for evaluating the costs of virtual links that directly connect the country boundary nodes.

Finally, the XML map data of the L-0 layer which is an administrative region of world level include information (cost tables) to manage country level clusters that are located in the world. The information is used for route calculation (cost evaluation) involving a route that crosses over two or more administrative clusters (countries) such as United States of America, Canada, Mexico, etc., in the world via the boundary nodes on the boundaries of such countries. The world level map data in the layer L-0 includes boundary nodes of the countries as well as boundary nodes of the world itself.

The number of layers and a category of areas such as city, county or state may vary depending on administrative systems of particular countries. For example, in a certain country, prefecture or province or other municipalities may be used as categories of administrative regions. In principle, as noted above, the higher the layer or level, the wider the area covered, and further, the higher the layer or level, the smaller the number of such clusters.

Figure 1A:
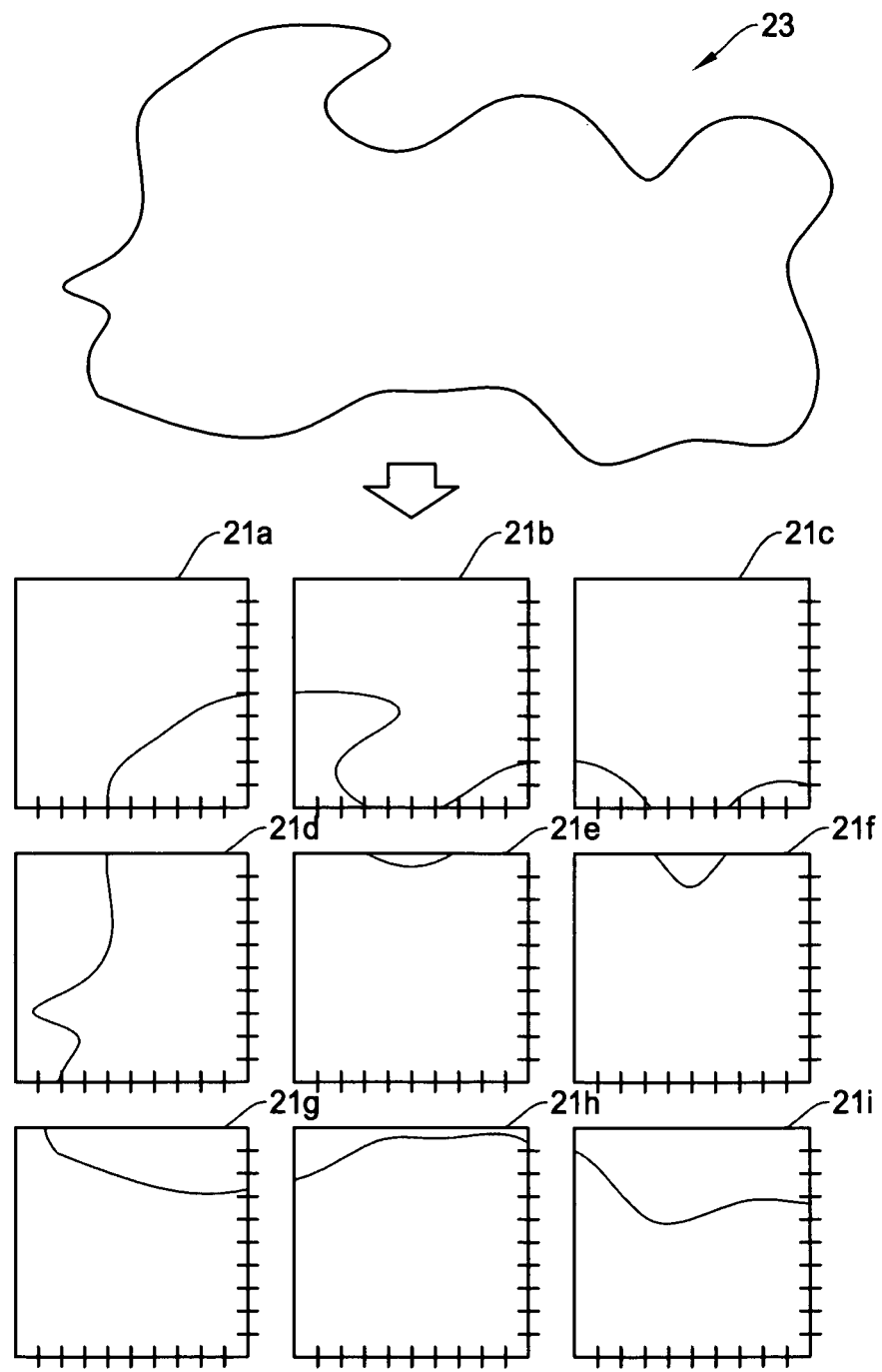
FIG. 1A is a schematic diagram showing a conventional method of utilizing the map data for a navigation system by dividing a selected area into a plurality of rectangular areas or map cells.
Figure 1B:
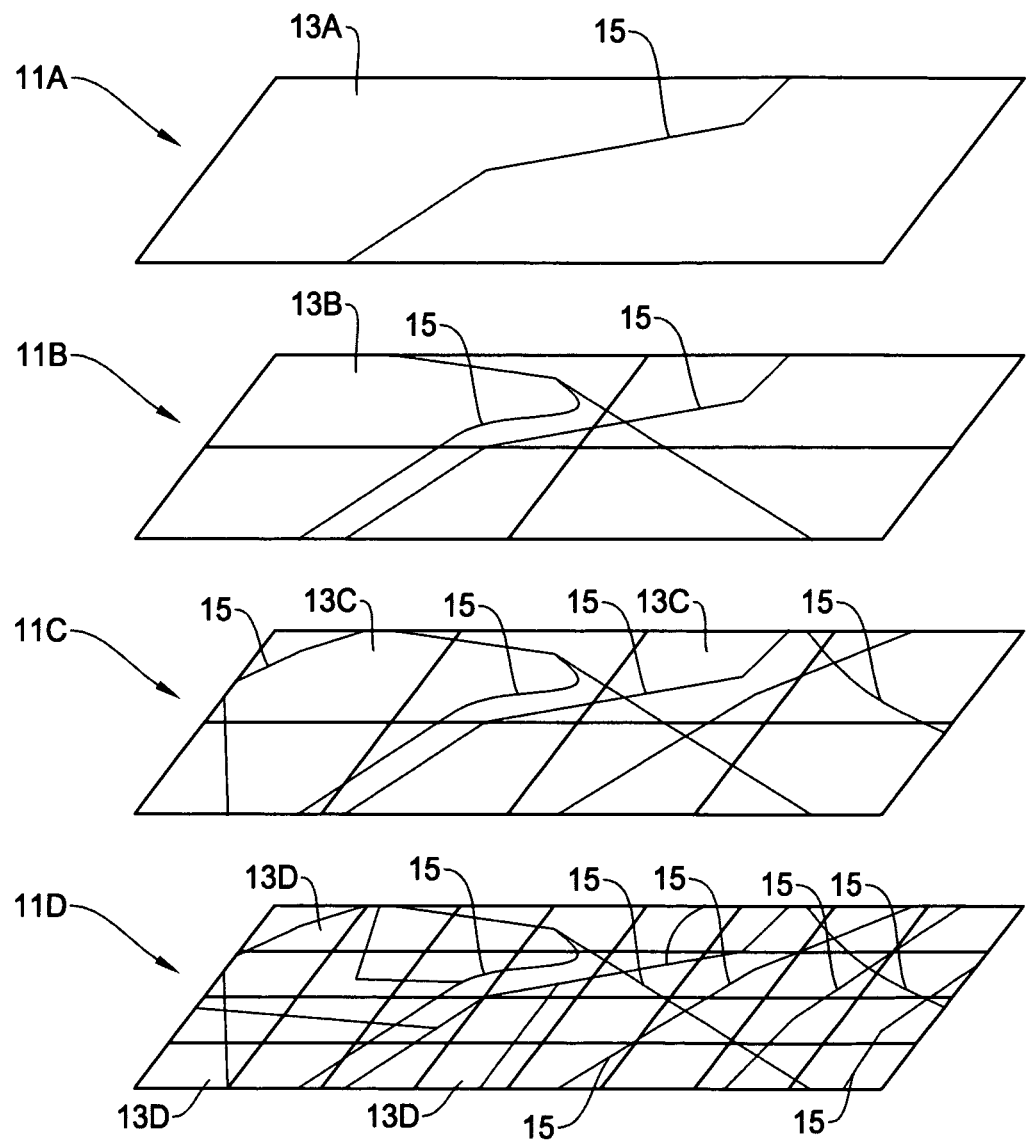
FIG. 1B is a schematic diagram showing an example of multiple layer format of the map data used in the navigation system which includes a plurality of data layers where each data layer is configured by data divided in the form of meshes, roads of various classes, road links, nodes, etc.
Figure 2B:
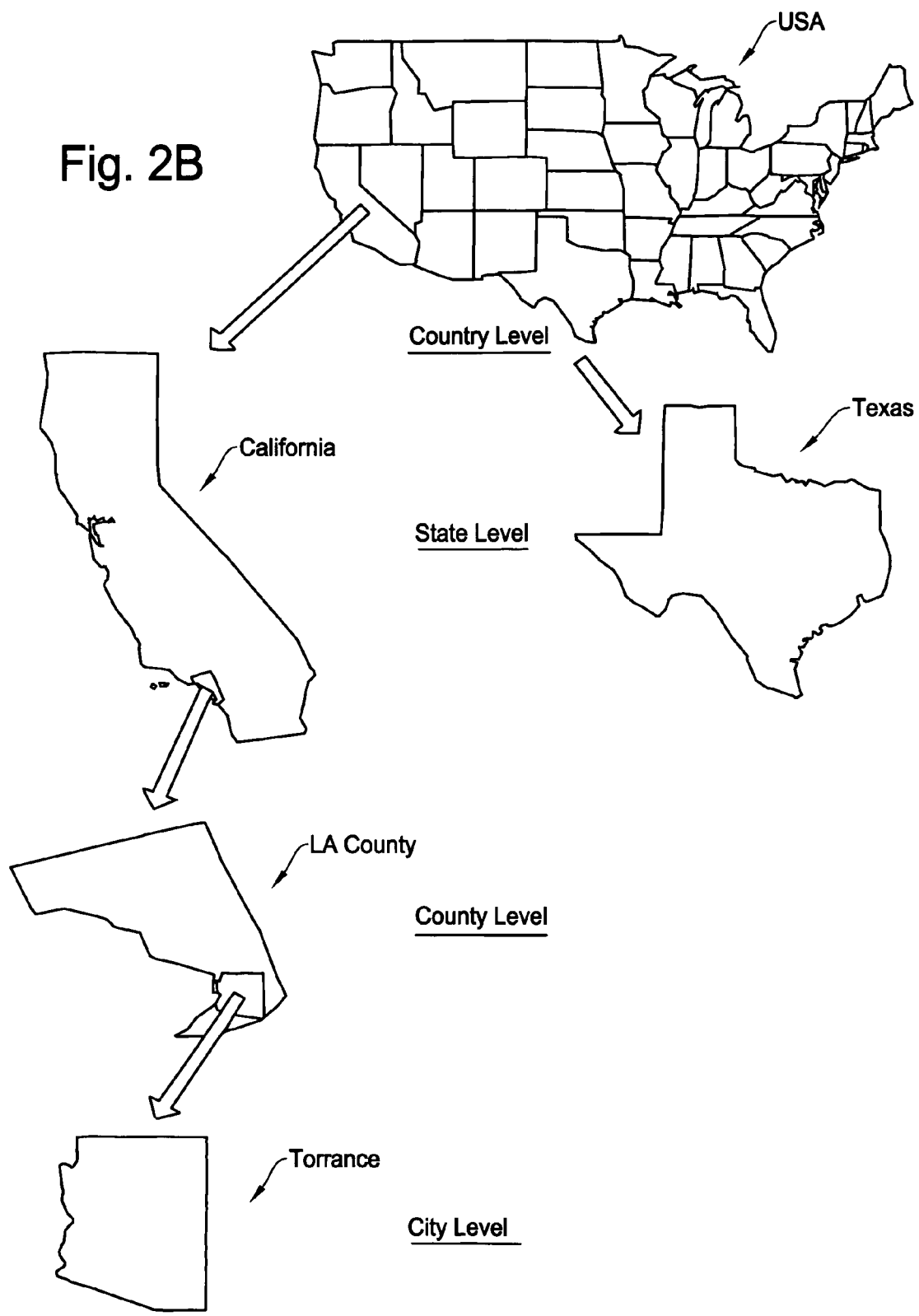

FIG. 2B shows map images of different levels or layers of administrative areas or regions from a country level to a city level which is a basic graphic representation of the data layers under the present invention. The layered structure of the XML map data organizes the map data by jurisdictional clusters (administrative regions). In the conventional technology, as shown in FIGS. 1A and 1B, the map data of the selected area is divided into a plurality of map cells or meshes. In the present invention, basically, the XML map data is constructed in a layered structure which is based on administrative areas or regions such as states, counties, and cities, which will be further divided into smaller cells and indexed.

In the example of FIG. 2B, the highest layer of the XML map data is assigned to an overall country, the United States of America (L-1 layer of FIG. 2A), the second highest layer is assigned to states (L-2 layer of FIG. 2A). Further, the next layer is assigned to counties (L-3 layer of FIG. 2A), and the lowest layer is assigned to cities (L-4 layer of FIG. 2A). The L-0 layer of FIG. 2A representing a part or an entire world is not shown in the example of FIG. 2B.

Figure 3A:
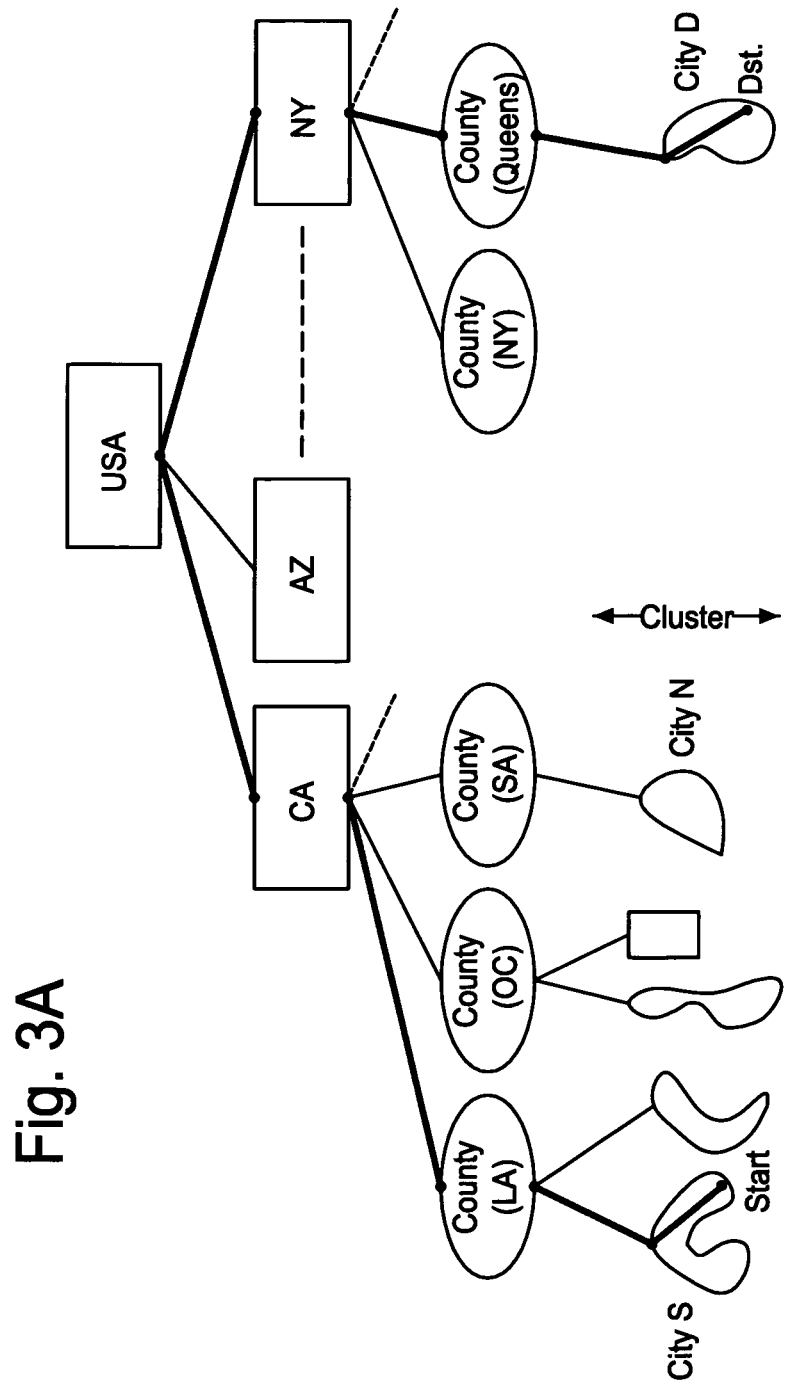
FIG. 3A is a schematic diagram which describes the data structure used for the route search method that implements the spatial indexing under the present invention where the data structure includes administrative clusters of different level to show how the route is detected between the start point and the destination point.

FIG. 3A is a schematic diagram which describes the data structure used for the navigation system for implementing the indexing method of the present invention where the data structure includes administrative clusters of different level to show how the route is detected between the start point and the destination point. As shown, the data is represented in a tree or layered structure where the highest cluster represents a country (USA) and the lowest clusters represent cities. Under the country cluster level is state cluster level which are, for example, California or New York where each state has county clusters. In this example, a start point is located in a city cluster S and a destination point is located in a city cluster D. The route search and calculation can be performed by evaluating the costs from one cluster to another cluster via the cluster boundary nodes, and the boundary nodes of the cluster S to the start point and the boundary nodes of the cluster D to the destination point.

Namely, when a route search is to be performed, the route search method under the present invention will first determine the connection from the start point to a boundary node of the city (cluster S) wherein the start point is located. Then, the route (virtual link) from the city boundary nodes to the county boundary nodes is determined, which in this case is Los Angeles county. From the boundary nodes of the Los Angles county, the connection (virtual link) to the boundary nodes of a California state boundary is determined.

The route search is able to find optimum connection between the state of California and New York by evaluating various costs of virtual links connecting the boundary nodes. Similarly, the route between the New York to Queens county, the route between the Queens county and the city D will be determined. Finally, the route search method determines the connection between the boundary node of the city (cluster D) to the destination point.

Typically, in an actual application, the route search is made from both ends (start point and destination) to the opposite directions. Thus, the search for the connection between the destination point and the boundary node of the city (cluster D) can be made at the same time with the search for the connection between the start point and the boundary node of the city (cluster S). The route search method in the present invention is implemented by connecting the boundary nodes in the cost effective way as explained in detail by another application by the same applicant.

Figure 3B:
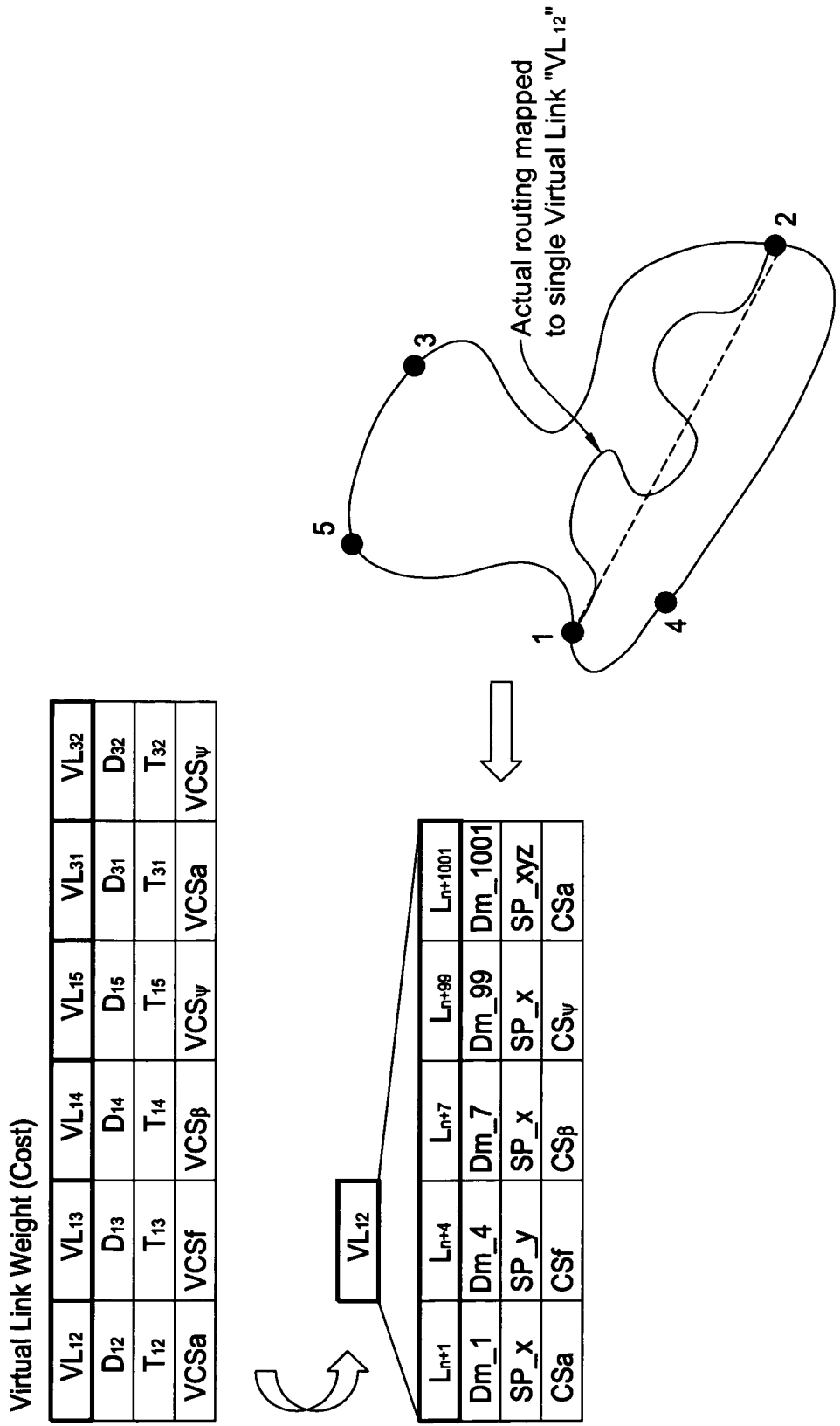
FIG. 3B is a schematic diagram showing an example of cost tables with respect to virtual links for evaluating an overall cost of each virtual link connecting the boundary nodes based on distances, speeds, and other factors, thereby determining an optimum route.

FIG. 3B is a schematic diagram showing an example of cost tables involved in the virtual links connecting the boundary nodes of the administrative regions. The example of FIG. 3B includes a virtual link weight (cost) table which is configured by distance values, travel time values, and space cost values for evaluating an overall cost of each virtual link connecting the boundary nodes. The cost space (VCS) values include, for example, traffic condition such as accident, construction, etc., time of a day, seasonal factor, vehicle type, type of road, etc.

The lower table in FIG. 3B shows further details of costs involved in a virtual link which is mapped to actual routes where each actual route is also provided with the distance value, travel time values and cost space value. In this example, the virtual link VL12 that connects the boundary nodes 1 and 2 shown in the map at the right side of FIG. 3B is broken into details of cost value. Namely, the lower table of FIG. 3B lists the data regarding the distance value, travel time values and cost space value of each of the actual links Ln+1, Ln+4, etc. that constitute the virtual link VL12.

Figure 4:
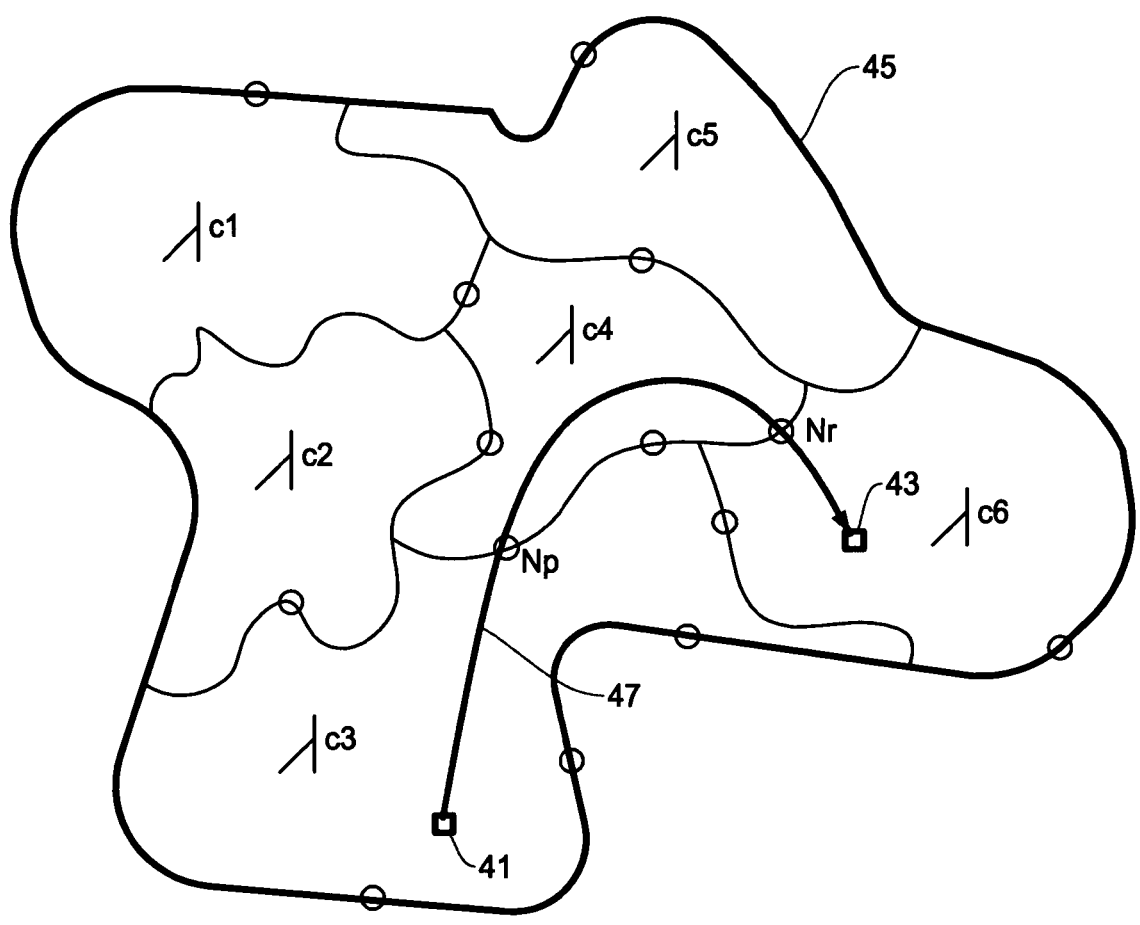
FIG. 4 is a schematic diagram showing an example of concept of the counterpart invention which implements the spatial indexing of the present invention showing as to how the boundary nodes and virtual links are used for a route search operation with respect to the cost tables for a plurality of administrative clusters.

FIG. 4 is a schematic diagram showing an example of map image that describes how the boundary nodes are used for cross-cluster route search and how the route search under the present invention can be advantageously utilized. In FIG. 4, a higher cluster 45 which may be an administrative region of county is indicated by a thick boundary line. Further, within the higher level cluster 45, several local clusters which may be administrative regions of city numbered from c1 to c6 are located.

In FIG. 4, a start point 41 exists within the local cluster c3 and a destination point 43 exists within the local cluster c6. In this manner, when a route is to be determined where the destination point is located in a different cluster from the cluster where the start point exists, the boundary nodes are used to obtain an optimum route between the start and destination points. In the present invention, the higher cluster 45 has information (cost tables), in the manner shown in FIG. 3B, to allow the navigation system to evaluate the virtual links connecting the boundary nodes of the local clusters c1 to c6.

Thus, the navigation system determines which virtual links connecting between the boundary nodes are better suited for constituting an optimum route. The cost tables in the higher cluster 45 are used for evaluating an overall cost of each virtual link connecting the boundary nodes of the clusters c1-c6 based on distances, speeds, travel times, and other factors including current traffic condition, weather, etc. The one or more virtual links selected as cost effective are converted to physical roads and links for which the overall costs are further examined and compared, thereby determining an optimum route between the start point and the destination point for a route guidance operation.

When a conventional route search method, such as an A* algorithm, is used to calculate a route from the start point 41 to the destination point 43, a route that goes through only the local clusters c3 and c6 is likely to be established. However, the higher cluster that stores cost tables of virtual links from the local cluster c3 to the local cluster c6 may have information indicating that an optimum route from the cluster c3 to the cluster c6 is achieved by going through the local cluster c4. Thus, the route search method under the present invention is able to find an optimum route with higher quality or accuracy indicated by the calculated route 47.

Because the higher cluster 45 has information (cost tables) to manage the lower (local) clusters c1-c6, the route search method under the present invention is able to specify which clusters must be incorporated in the route calculation. The method of the present invention can also specify boundary nodes of the clusters to be used for the calculated route. As a result, an optimum route calculation can be achieved in a short period of time by minimizing the amount of data to be retrieved and processed for calculating the route.

Figure 5A:
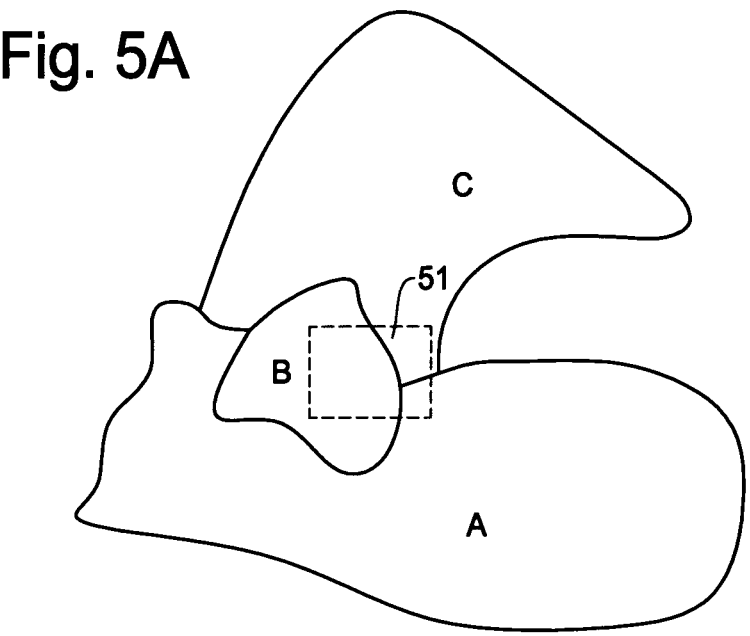
FIGS. 5A and 5B are schematic diagrams showing the situations and possible problems that would be encountered in processing the XML map data organized only as a unit of administrative region by the navigation system.
Figure 5B:
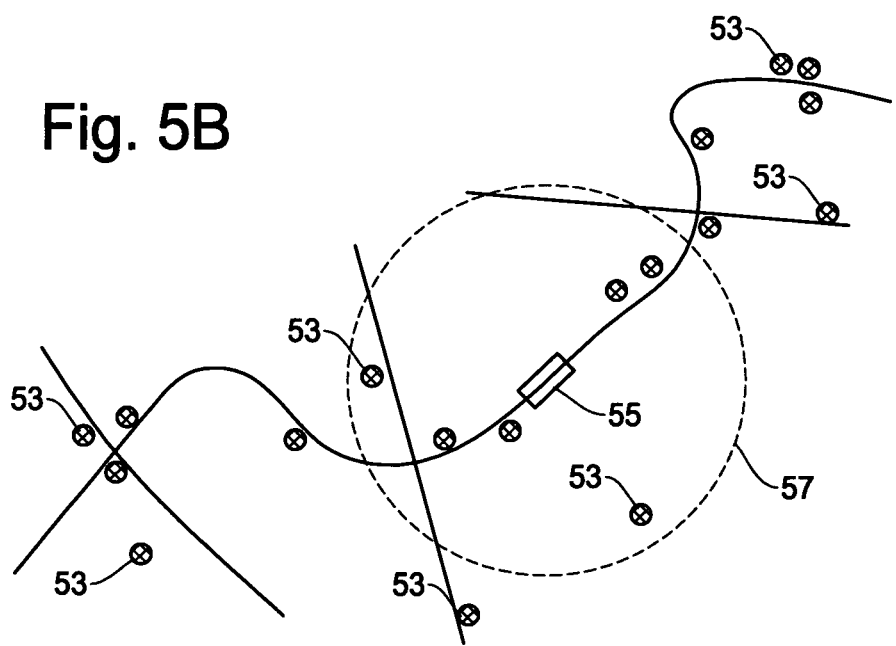

FIGS. 5A and 5B are schematic diagrams showing situations where a query or a search related to a particular area of the map can pose a problem when the map data is treated only as a unit of administrative region. In the navigation system of the present invention using the XML map data, as noted above, an administrative cluster or region such as a city or county are used as the basic unit or area of the map data. In the example of FIG. 5A, it is assumed that administrative regions A, B, and C are located adjacent to one another, and an area 51 indicated by the dotted square is to be focused for some reason.

Under such a situation, the map data retrieval as a unit of administrative area will require a large amount of data since all of the administrative areas A, B, and C must be retrieved. Thus, the performance of the navigation system may be deteriorated when such a large amount of map data must be read in a memory of limited capacity and/or processed by a CPU of limited power. Even when the map data of only one administrative region is to be retrieved, the administrative region can be too large for a particular purpose concentrated to a small area that it deteriorates the performance of the navigation system.

Thus, it is desirable to retrieve and process the map data of only an appropriate area such as the area 51 rather than the map data of overall administrative regions. FIG. 5B is a schematic diagram showing another example of map for explaining the situation similar to that of FIG. 5A. In the example of FIG. 5B, several streets, a vehicle, and many POIs (points of interest) are located within a relatively small area.

A vehicle 55 is located on a street and many POIs 53 are located along the street where the vehicle 55 is illustrated at the center of a circle area 57 defined by a dotted line. Typically, searching and/or displaying POIs located within a certain distance range from the vehicle 55 is an important feature for a navigation system. Thus, when the POIs 53 located in the circle area 57 are to be extracted, it is necessary to retrieve the map data of the specific small area rather than a large area such as an overall city.

Thus, in the spatial indexing method of the present invention, the XML map data as a unit of administrative region is further divided into small map cells and are indexed by a unique indexing method. FIG. 6 is a schematic diagram showing a plurality of such small map cells that partition the map data and objects in a larger area to describe the relationship between the objects, map cells, and XML descriptions. As shown, the map data corresponding to the whole or part of the administrative region is partitioned into a plurality of small map cells, each of which is given an identification (index) number.

The index numbers for the map cells are assigned based on a predetermined pattern or trace, in this example, an N-curve for sequencing the map data. Thus, for each of the map cells, proceeding from the map cells 0, 1, 2 and to 3 makes an N-shape trace pattern as shown in the arrows in a schematic diagram of FIG. 10. Likewise, a trace of sequence from the map cells numbers 4 to 7 makes an N-shape as well.

Referring to an area 31 indicated by the box of dotted lines in FIG. 6, a particular road structure is illustrated inside the area 31. The circles in the area 31 represent nodes of road link where each line that runs from one node to another node represents a road link. In the example of FIG. 6, the road structure extends to the map cells 4, 6, 7, 12 and 13 where each object (road link and nodes) belongs to the area (maximum boundary rectangle) 31. Further in the example of FIG. 6, at an upper right thereof, a maximum boundary rectangle 33 is illustrated by the dotted line which covers a park where the park extends to the map cells 49, 51, 54, 57, 60 and 59.

FIG. 7A shows an XML description example representing the road structure in the maximum boundary rectangle 31 in FIG. 6, and FIG. 7B shows an XML description example representing the park in the maximum boundary rectangle 33 in FIG. 6. Specifically, the XML description example shows information of, among others, an ID (identification) of the particular object and the map cells that boarder the object. With respect to the example of FIG. 7B showing the description of the park, coordinates of the park are shown as −7393904, −4078036, etc. After the tag "<mbr id "R1">", where mbr indicates a maximum boundary rectangle, the coordinates of the maximum boundary rectangle for the park are shown. The tag "<SpaceFilling level "3">" followed by the tag "49, 51, 54, 57, 59, 60/>" indicates that map cells 51, 54, 57, 59, and 60 in the level (layer) 3 contains the park object.

FIG. 8A shows a table that describes how to create an N-shape trace indexing under the present invention for assigning the index numbers to the map cells, and FIG. 8B supplementally describes how the two dimensional data Xi and Yi (X address data and Y address data) are combined into a one dimensional data (Xi, Yi) for the N-shape trace. FIGS. 9A and 9B are schematic diagrams showing an actual application as to how an X-axis address data of 16 bits and a Y-axis address data of 16 bits for a geographic area are used to create the index numbers sequence (Xi, Yi) of 32 bits for the N-shape trace indexing.

Referring to the table of FIG. 8A, in this example, the X-axis is numbered from 0 ("0000") to 3 ("0011") and the Y-axis is numbered from 0 ("0000") to 15 ("1111"). The N-curve trace for indexing the area is determined by a procedure that arranges the X address bit Xi and Y address bit Yi by alternating each bit, (Xi, Yi). In the table shown in FIG. 8A, each of an X address bit and a Y address bit is 4 bits, respectively, and the resultant 8 bit data for area indexing is created for simplicity.

FIG. 8B shows this procedure in a generic form where the X address bit Xi and Y address bit Yi are combined by alternating each bit for creating a one dimensional data (Xi, Yi). As shown, when Xi=X0, X1, X2, X3 and Yi=Y0, Y1, Y2, Y3, the combined one dimensional data (Xi, Yi): Xi Ω Yi→Value (X3 Y3 X2 Y2 X1 Y1 X0 Y0)$_n$ binary bit integer. Thus, for the X-axis of 0 ("0000") and the Y-axis of 0 ("0000"), the most significant bit of the X-axis bit X3 is 0 and the most significant bit of the Y-axis bit Y3 is 0, which will return "00" according to the rule of FIG. 8B described above.

By repeating this procedure throughout bits of the both X and Y addresses creates "00000000" as shown in the table of FIG. 8A. Likewise, for an X-axis of "0001" and a Y-axis of "1111", the most significant bits of the X and Y axes will become 01, and the next most significant bits of the X and Y axes will be 01. Thus, by repeating this procedure, finally, the bit data "01010111" is obtained. In the table of FIG. 8A, decimal numbers in parentheses indicate the resultant numbers formed by the X-axis bits and the Y-axis bits. As shown, N-curve is formed by following the index numbers from 0 to 3, 4 to 7, as well as 8 to 11, etc.

The schematic diagram of FIG. 9A shows a more actual case where an X-axis and a Y-axis each having 16 bits of address data, and in order to index the map cells, the X-axis address bits and the Y-axis address bits are alternately combined according to the process of FIG. 8B. Thus, the counting from the most significant bits, X15, Y15, X14, Y14, X13, Y13 ... and to the least significant bits in the same manner to create a one-dimensional indexing (addressing) data having 32 bits as shown in FIG. 9B. It should be noted that a middle part in FIG. 9B is omitted for the sake of simplicity of illustration.

Figure 10:
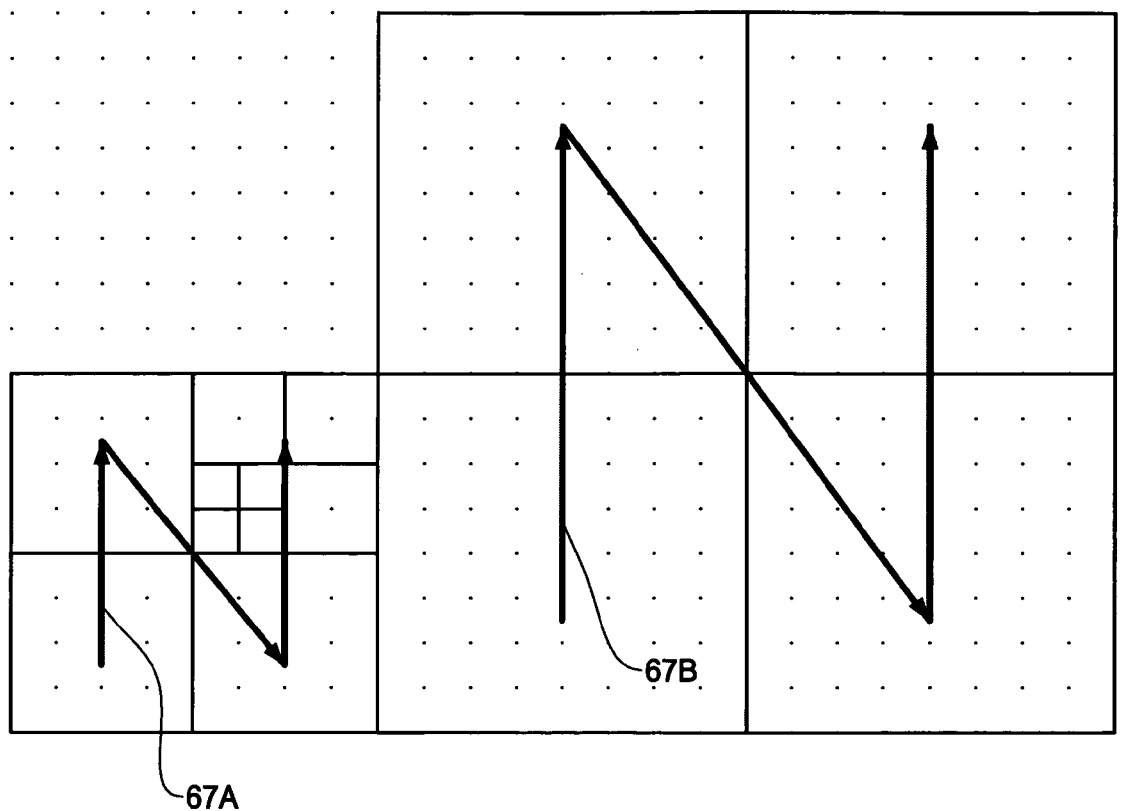
FIG. 10 is a schematic diagram showing an example of method for dividing the map cells with different layer (sizes) and an N-shape curve trace for sequentially indexing the map cells in accordance with the spatial indexing method of the present invention.

FIG. 10 is a schematic view showing the division of the area into map cells and the manner of indexing the map cells through the N-curve tracing in accordance with the present invention. An arrow 67A in the left shows the N-curve shape that shows the order of indexing the medium sized map cells, and an arrow 67B in the right shows the N-curve shape that shows the order of indexing the large sized map cells. By repeating the N-curve shape indexing procedure, all the map cells can be sequentially connected and accessed where each map cell can be split into four smaller map cells of a lower layer (level).

The map data or object data that is generally defined by two dimensional data (X-axis and Y-axis address data) can be handled as one dimensional data (as a continuous one stroke from one map cell to another) for indexing and addressing as shown in FIGS. 8A-8B and 9A-9B noted above. As described above with reference to FIGS. 8A-8B and 9A-9B, by combining each bit of the X and Y axis of map data to make an integer, the indexing in the one dimensional data can be created with ease. The spatial indexing method of the present invention is applied to the overall XML map data which is configured in a hierarchal manner, i.e., a multi-layered structure. Either N-curve or U-curve but not both is adaptable to three dimensional curve representation for a given spatial sequence whose coordinates $x_n$, $y_n$ and $z_n$ (n=0, 1, 2, ... N, where N is the length of the spatial sequence) are uniquely determined by the N/U transformation of spatial sequence.

Figure 11:
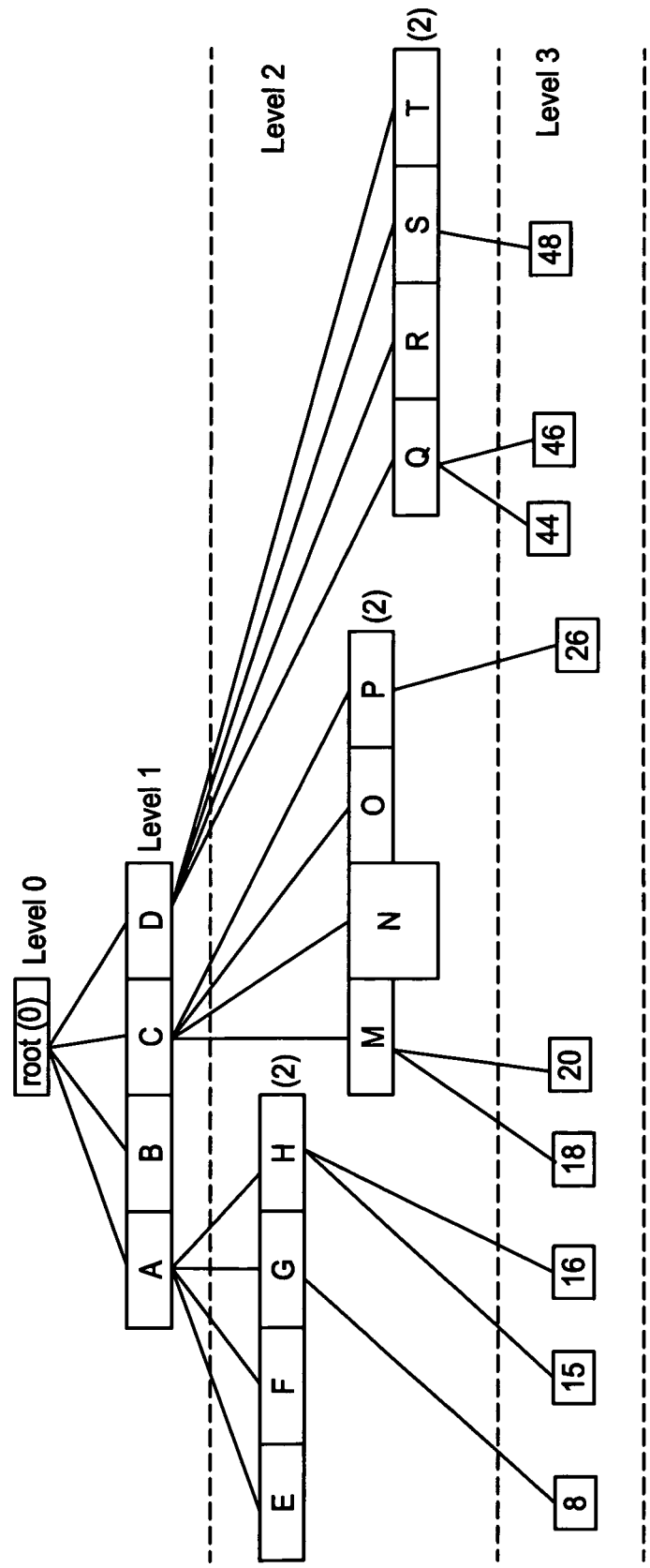
FIG. 11 is a schematic diagram showing an example of a multi-layered indexing structure (tree structure) which corresponds to the multi-layer structure of the XML map data shown in FIG. 2A in accordance with the spatial indexing method of the present invention.

An example of a multi-layered indexing structure is shown in the schematic diagram of FIG. 11, which is a tree structure that comprises four levels of XML map data ranging from the highest level (level 0) to the lowest level (level 3) and which is typically correspond to that of FIG. 2A. FIGS. 12A, 12B, and 12C are schematic diagrams showing map cells and their IDs and index numbers corresponding to the tree structure shown in FIG. 11. In the schematic diagrams of FIGS. 12A-12C, the structure of level 1 is shown in FIG. 12A, the structure of level 2 is shown in FIG. 12B, and the structure of level 3 is shown in FIG. 12C.

Each map cell (data space) is decomposed into its four map cells in an immediately lower level where each map cell is tested for intersection with a query object. The level 1 in FIG. 11 is the highest level and is divided into cell A, B, C and D as shown in FIG. 12A. The level 2 in FIG. 11 is the level right below the level 1 and is divided into sixteen map cells as shown in FIG. 12B. For example, the map cells E, F, G and H in the level 2 are the map cells that correspond to the map cell A in the level 1.

Thus, as the level lowers by one, the cells are divided into four smaller cells. In the cell diagrams of FIG. 12C, an object 61 is located in the map cells N, 16, 15, 8, 18, 20, 26, 48, 46, and 44. Thus, in retrieving an area for the object 61, these map cells will show the map information and have to be accessed. In the example of FIGS. 11 and 12A-12C, the level 3 has the smallest (the most detailed) map cells indicated by the index numbers where the four cells comprise the corresponding cell in the level 2.

With respect to the schematic diagram of FIG. 12C, not only the cells in the level 3 but also the cells in the level 2 and 1 are shown to define the object 61. Here, only the cells in the level 3 that touch the object 61 are provided with the cell numbers, i.e., the cell numbers 8, 11, 16, 18, 20, 26, 44, 46, and 48, and the object 61 also touches the cell N on the level 2. It should be noted that although different sizes of the map cells are shown in FIG. 12C for explaining the relationship between the object 61 and the map cells of various levels, the map cells in the level 3 are of the smallest ones designated by numerals such as 8, 11, 16, 18, 20, 26, 44, 46, and 48.

The area that touches the object 61 can be represented by the tree structure (layered structure) of the map data shown in FIG. 11. Namely, in FIG. 11, the uppermost level ("level 0") has links to the map cells A, B, C, D in the level 1. Each of the map cells in the level 1 further has four links in the immediately lower level, i.e., the level 2 of the tree structure. For instance, the map cell A links to the map cells E, F, G, and H in the level 2, the map cell C links to the map cells M, N, O and P in the level 2, and the map cell D links to the map cells Q, R, S and T in the level 2, respectively.

For the map cell G in the level 2, only the map cell 8 in the level 3 is linked as it is the only cell relevant to the object 61 as shown in FIG. 12C. The map cell H in the level 2 links to both the map cells 15 and 16 in the level 3, and the map cell M in the level 2 links to the map cells 18 and 20 in the level 3. The map cell N in the level 2 is enlarged in FIG. 11 and does not have map cells in the level 3, which indicates that the object 61 touches the whole of the map cell N so that it is unnecessary to break down to the map cells in the level 3. Consequently, for extracting the area for the object 61, the whole of map cell N will be retrieved.

In order to define an object with use of the spatial indexing method, the appropriate layer and the cells of the map data that can cover the object in an optimal manner is selected. For instance, for a lager object, an upper layer would be preferred because each cell in the upper layer is able to cover a larger area. Moreover, which layer should be used may also depend on how detailed data for the particular object is necessary.

An example of a sequence (path) that is implemented to the spatial indexing under the present invention for retrieving the map data is described with reference to FIGS. 13A to 13C. FIG. 13A is a schematic view of the map cells similar to that of FIG. 12C except that the object 61 is omitted and the cell 46 is highlighted. In expressing or representing the cell 46 in FIG. 13A, the numbers of layer and the indexes of the cells (such as X-Y coordinates) are used. The lower the number of the level, the larger the cell unit.

FIG. 13B shows a simplified view of the map data that is divided into four smaller map cells. For Pos 1, the X value is "00", and the Y value is also "00" in binary. For Pos 2, the X value is "00" and the Y value is "01", and for Pos 3, the X value is "01" and the Y value is "00". For Pos 4, the X value is "01" and the Y value is also "01".

The table in FIG. 13C shows the values for the map cell 46 in the multiple-cells in FIG. 13A. On the level 1, the map cell is divided into the size of cell A, B, C, and D as shown in FIG. 12A. For the map cell 46, on the level 1, axis X and Y are both 1 ("01" in binary) since it is located in the cell D at the upper right location, which is equivalent to Pos 4 in FIG. 13B. On the level 2, the map cells F, E, R, or T located in map cell D are considered. The value of the X and Y axes on the level 2 are both 0 since it is where the map cell 46 is located in a map cell Q (having the map cells 44-47).

Finally, on the level 3, the value of X is 1 and the value of Y is 0 since the map cell 46 is located in the map cell Q at the position equivalent to Pos 3 in FIG. 13B. By arranging the value of the X-axis from level 1 to level 3, "101" in binary, which is "5" in decimal, is obtained. Similarly, a decimal value of Y is "4", which is "100" in binary, is obtained. In this manner, the path setting operation for specifying a particular map cell or object can be easily performed for the XML map data that is divided into small map cells under the present invention.

Figures 14A, 14B:
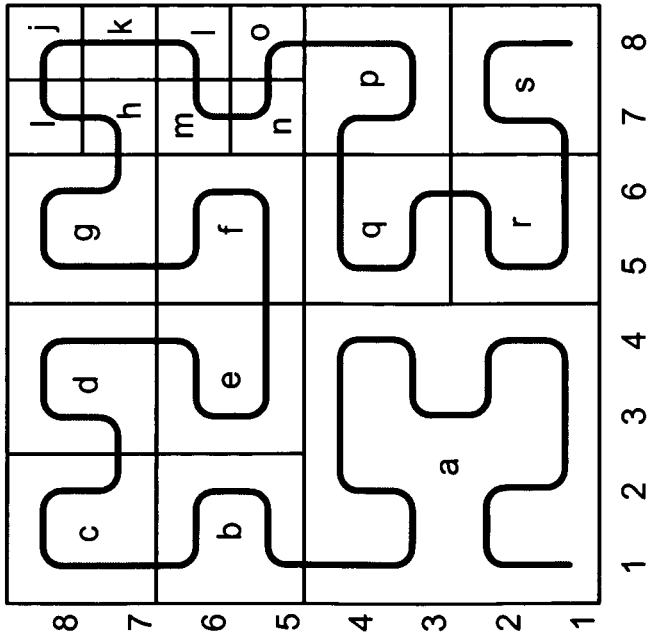

The spatial indexing in the present invention for sequencing the map cells is not limited to the N-curve trace indexing method described above. FIG. 14A is a schematic diagram showing a U-curve trace indexing that can be used instead of the N-curve trace indexing described above. FIG. 14B shows an area that is divided into 64 map cells. By following the numbers from 1 to 64 of the map cells in FIG. 14B, the direction line (U-curve trace) will be obtained which has U-shapes in various directions.

Namely, for neighboring four map cells, a sequence that follows the map cells index numbers 1, 2, 3, and 4, for example, a U-curve shape is drawn as shown in FIG. 14A. The U-curve shape can be directed either upwardly, downwardly, leftwardly, and rightwardly by following the index numbers from the lower numbers to the higher numbers. The U-curve trace indexing can be used in the similar way as the N-curve trace indexing noted above under the present invention. FIG. 14A shows map cells "a" to "j" with different levels (layers), which correspond to the map cells in the schematic diagrams of FIGS. 14C and 14D.

Figures 14C, 14D:
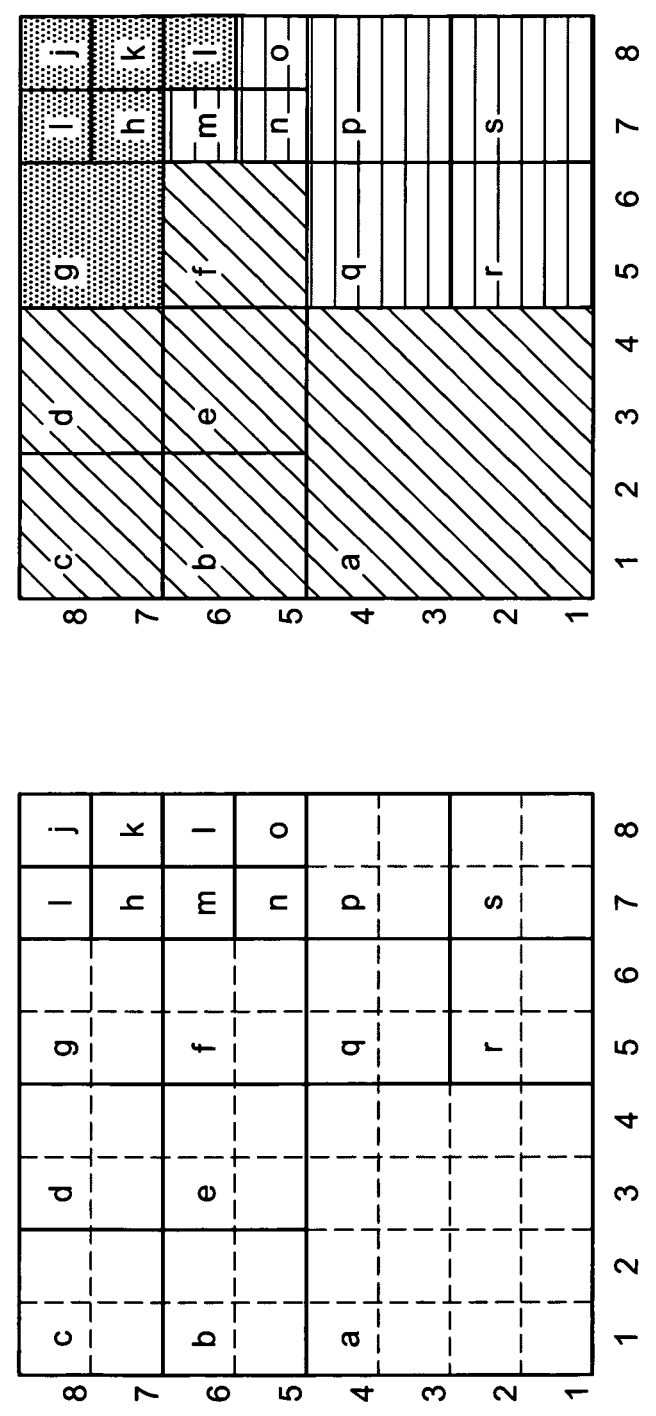

The map cell "a" represents a large area (level 1 in FIG. 12A) comprised of 16 small map cells (level 3 in FIG. 12C) as most clearly viewed in FIG. 14C. Each of the map cells "b, c, d, e, f, g, p, q, r, and s" represents intermediate size areas (level 2 in FIG. 12B) each being comprised of four smaller cells. When selecting the map cells, in addition to the traditional X-Y addressing method, the navigation system is able to select either the N-curve trace indexing method or the U-curve trace indexing method by the one dimensional indexing (addressing) data noted above with reference to FIGS. 8A-8B and 9A-9B. As noted above, either N-curve or U-curve but not both is adaptable to three dimensional curve representation for a given spatial sequence whose coordinates $x_n$, $y_n$ and $z_n$ ($n=0, 1, 2, \ldots N$, where N is the length of the spatial sequence) are uniquely determined by the N/U transformation of spatial sequence.

FIG. 14C and FIG. 14D show the map cells of different sizes (level) where each map cell is designated by alphabetical letters a-s. It should be noted that these alphabetical letters are provided for identifying the map cells for an explanation purpose, however, in an actual application, the map cells are designated by index numbers that have been assigned by the spatial indexing method of the present invention. FIG. 14D shows three objects on the map data each being provided with hatches which will be further explained with reference to FIG. 15.

Figure 15:
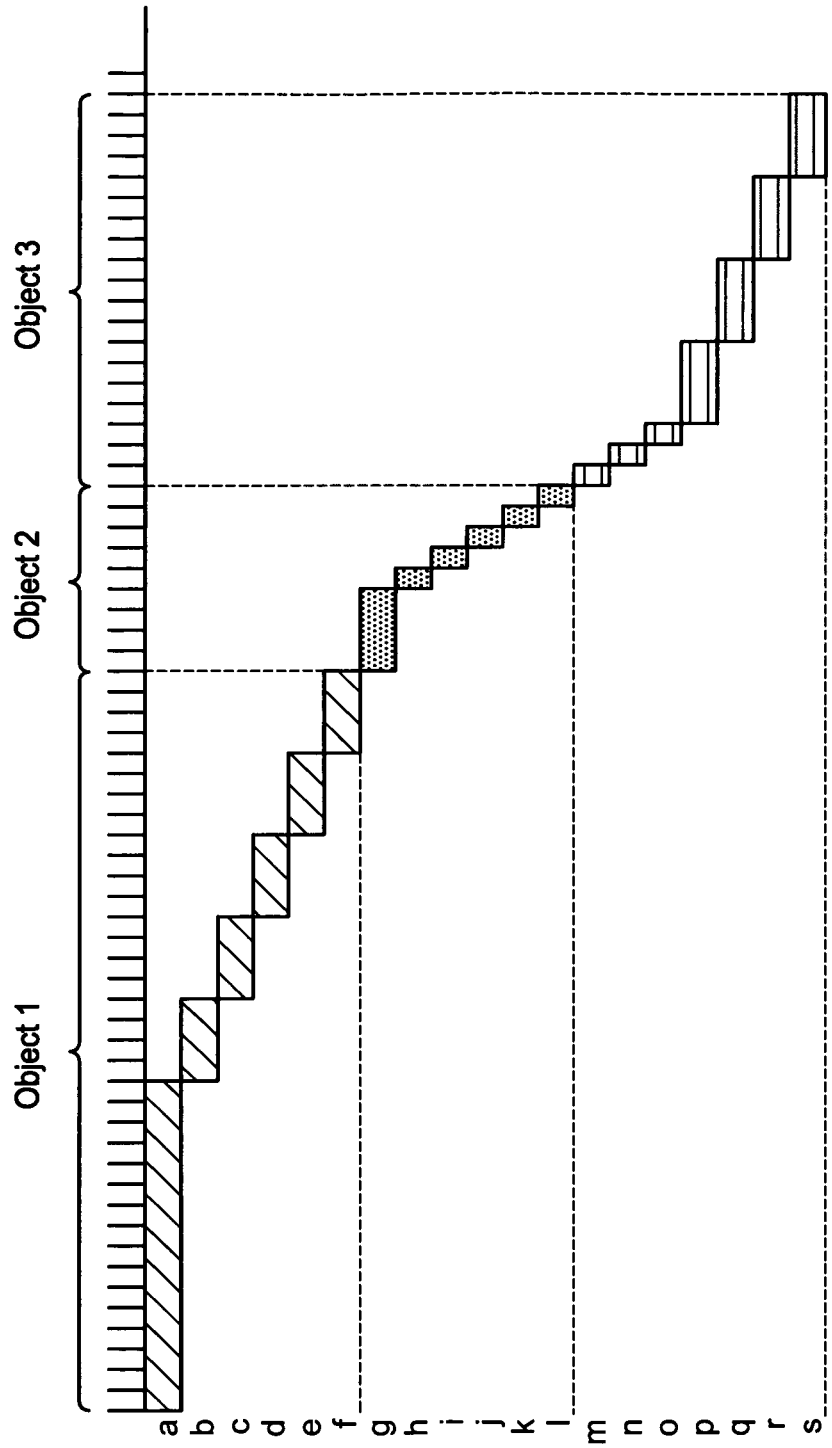
FIG. 15 is a schematic diagram showing an example of the spatial indexing of the present invention for retrieving the objects that correspond to the areas indicated by the hatches shown in FIG. 14D.

FIG. 15 is a schematic diagram showing the spatial indexing of the present invention for retrieving the objects (map cells) that correspond to that shown in FIGS. 14A to 14D. The area for an object 1 is comprised of the areas (map cells) "a, b, e, d, e and f" as indicated by the slant hatches in FIG. 14D. The area for an object 2 is comprised of the areas (map cells) "g, h, i, j, k and l" as indicated by the dotted hatches in FIG. 14D. The area for an object 3 is comprised of the areas (map cells) "m, n, o, p, q, r and s" as indicated by the horizontal hatches in FIG. 14D.

As shown in FIG. 15, regardless of the size of the cells, the addressing the objects through the spatial indexing can be created in succession. For the object 1, the cell "a" in the level 1 is specified first and the cells "b", "c", "e", "d", and "f" in the level 2 are sequentially specified (N-curve trace). Thus, the object 1 that is configured by the cells "a", "b", "c", "d", "e", and "f" with the slant hatches in FIG. 14D can be specified.

Similarly, with respect to the object 2 with the dotted hatches as shown in FIG. 14D, the cell "g" in the level 2 is specified first and the cells "l", "h", "i", "k", and "j" in the level 3 are sequentially specified (N-curve trace). Because of the indexing structure, such as in the N-curve trace indexing noted above, the two dimensional data can be combined to the one dimensional data to generate the N-curve trace indexing (addressing), which facilitates the indexing and addressing the map cells (objects).

Figure 16:
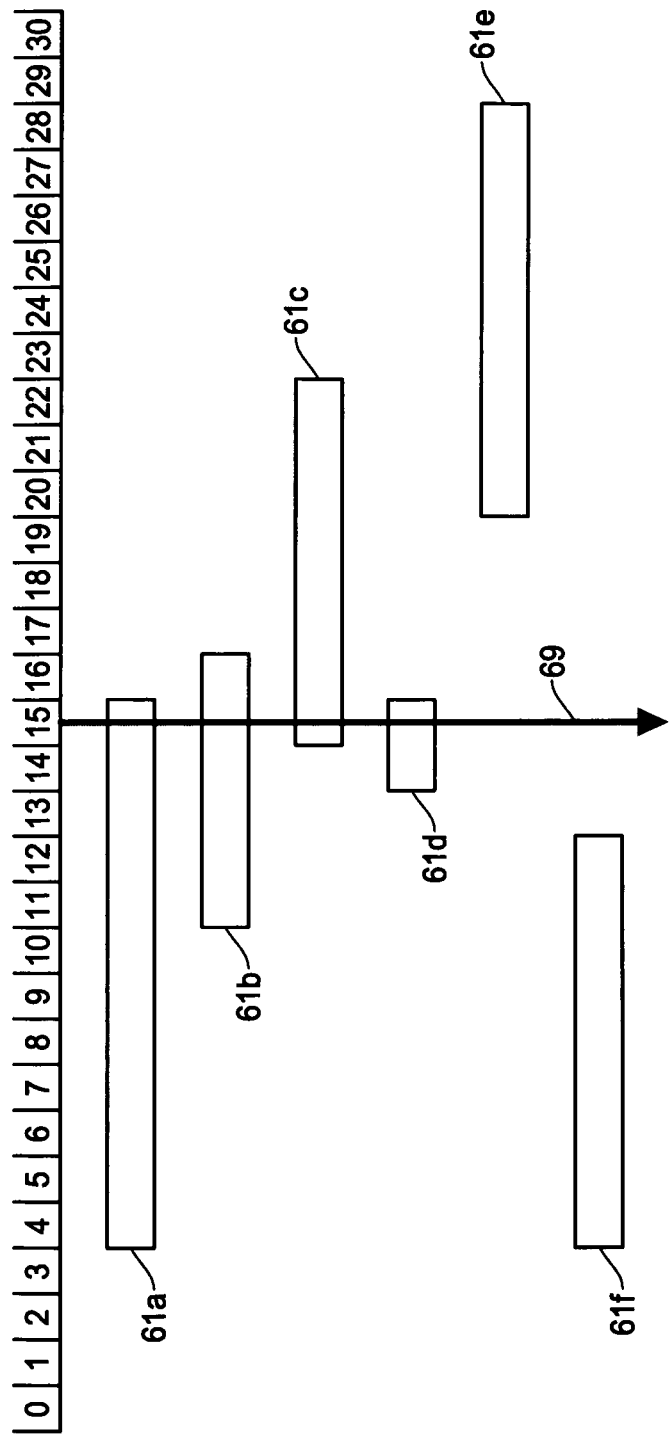
FIG. 16 is a schematic diagram showing an example of relationship between objects or map cells and the index numbers of the map cells assigned in accordance with the present invention.

FIG. 16 is a schematic diagram showing another example of abstract representation of objects in relation with map cells. In FIG. 16, objects 61a to 61f are shown in relation to the map cells which are numbered (indexed) from 0 to 30. For the object 61a, the map cells 4 to 15 provide all the information on this object, for the object 61b, the map cells 11 to 16 provide all the information on this object, and the map cells 15 to 22 provide all the information on the object 61c, and so on. Due to the spatial indexing of the present invention, the navigation system is able to retrieve the map data for desired objects by addressing the map cells with the address data indicating the spatially indexed numbers.

Further, in the spatial indexing of the present invention, when an object relating to a particular map cell such as a map cell 15 is to be searched, the navigation system can find relevant objects by looking though the map cell 15 in the manner shown in FIG. 16. An arrow 69 that extends from the map cell 15 indicates that it is able to find which objects are relevant to the map cell 15. In this example, objects 61a, 61b, 61c, and 61d are related to the map cell 15 while objects 61e and 61f are not.

Figure 17:
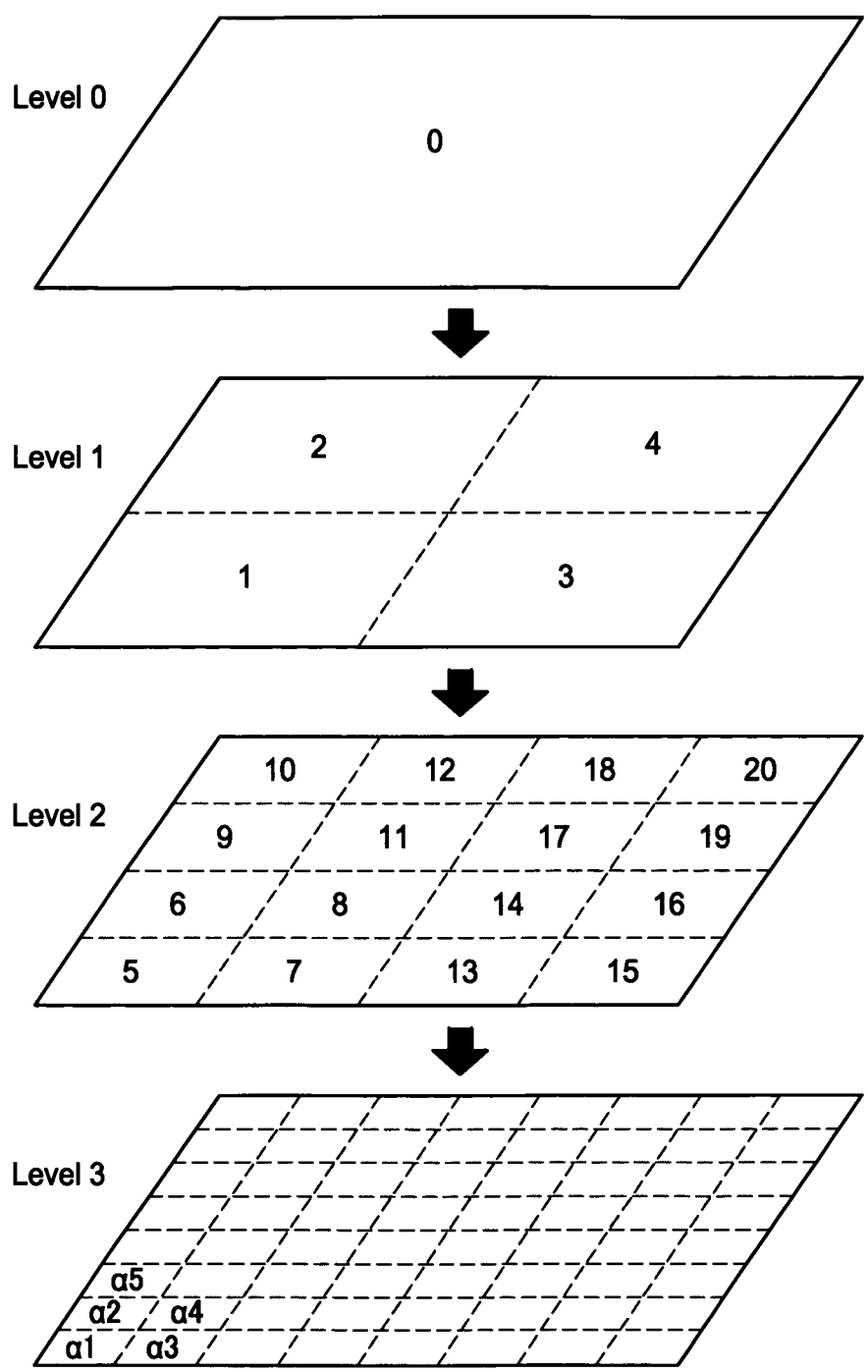
FIG. 17 is a schematic view showing an example of multiple layers of map data and map cells in each layer showing a unique identifier or an index number assigned to each map cell to specify the map cell without regard the level of the map data.

In expressing a level of the map data where the map data is in the multi-layered structure as shown in FIG. 17, such a level may be expressed by unique identifiers. In the alternative, each map cell may have unique identifier such that each identifier is able to define both the level and the map cell at the same time. The example of FIG. 17 shows the identifiers assigned to each cell which can also specify the level of the map data in the layered structure.

In FIG. 17, on the level 0, the cell is identified by a numeral (cell number) "0", and on the level 1 that is immediately below the level 0, the cells are uniquely identified by numerals (cell numbers) "1, 2, 3 and 4", respectively. Similarly, on the level 2, the cells are identified by numerals "5 to 20". In other words, since the same numeral is not used in the different levels (layers), the cell number can identify both the cell and the level at the same time. Thus, there is no need to specifically define the map level on which a particular map cell belongs because the unique identifier automatically defines the map cell and the level without specifically indicating the level.

Figure 18:
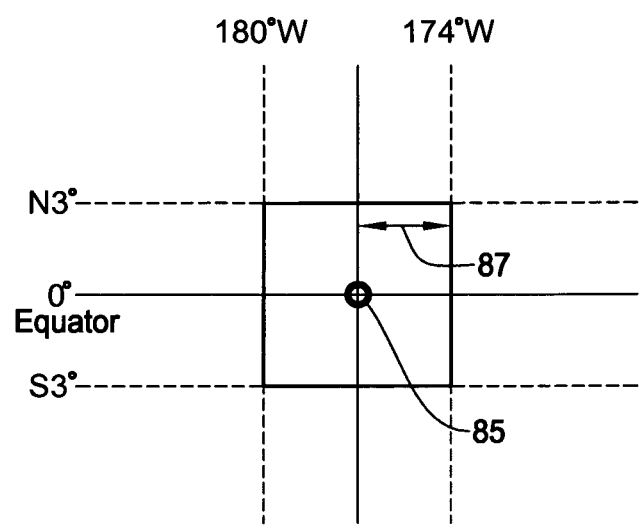
FIG. 18 is a schematic view showing a coordinate frame example utilizing a universal transverse mercator as a basic reference for dividing the area into a plurality of map cells in the present invention.

For making coordinates of the spatial search index of the map data, a reference point of map of the world can be set according to Universal Transverse Mercator (UTM). Referring to the schematic view in FIG. 18, a West longitude of 180 degrees is set as a reference longitude for UTM. An example of cell range of the spatial index is set to, for example, 6 by 6 degrees, which creates a space of 270 km indicated by a distance arrow 87 either to the East or West from a reference line drawn with respect to a coordinate origin 85 as shown in FIG. 18.

Figure 19:
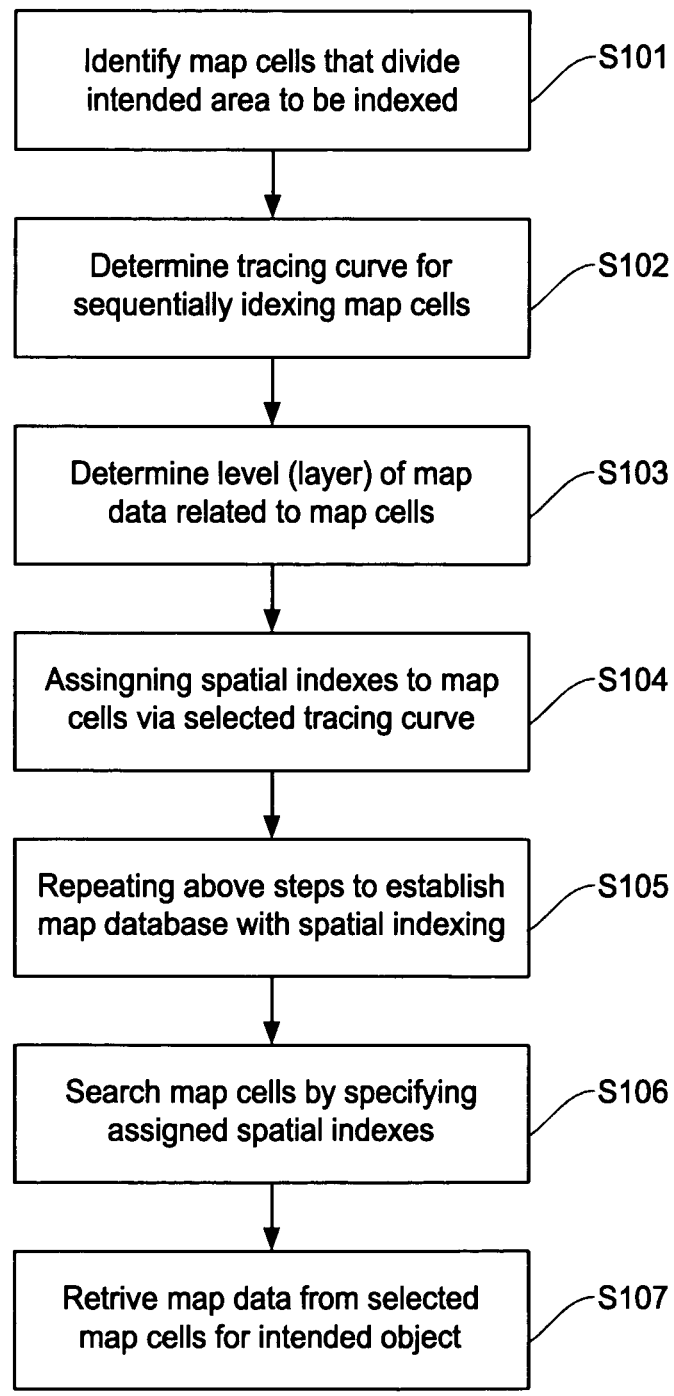
FIG. 19 is a flow chart showing basic steps in the process for creating the spatial indexing for the map cells that divide the administrative regions defined by the XML map data, specifying the assigned spatial indexes, and retrieving the map data from the selected map cells with respect to the intended object for use with the navigation system.

FIG. 19 is a flow chart showing an example of process for conducting the spatial indexing in the present invention for the map cells and retrieving the map data from the map cells that have been spatially indexed. In step S101, the map cells that divide the XML map data for an intended area such as an administrative region will be established and identified for each layer of the map data. Based on the shape, size, and other factors, the type of tracing curve such as the N-curve or U-curve described above is determined that can be best suited for indexing the map cells and the objects defined in the map cells in step S102. Then the process determines a level (layer) of the multiple layers of the XML map data on which the map cells are aligned for the spatial indexing in step S103.

In step S104, the map cells are provided with the spatial indexes by the sequence of the selected trace curve such as the N-curve trace or U-curve trace. By repeating the foregoing steps for all of the map cells in all of the layers of the map data, the map database in the XML format with the spatial indexes for the map cells will be created in step S105. After creating the map database with the spatial indexing of the present invention in the foregoing process, the map cells will be searched for a particular object by specifying the assigned spatial indexes in step S106. Namely, the navigation system generates address data that corresponds to the index numbers assigned to the map cells for retrieving the XML map data from the map database. Thus, in step S107, the process retrieves the map data from the selected map cells with respect to the intended object for use with the navigation system.

Figure 20:
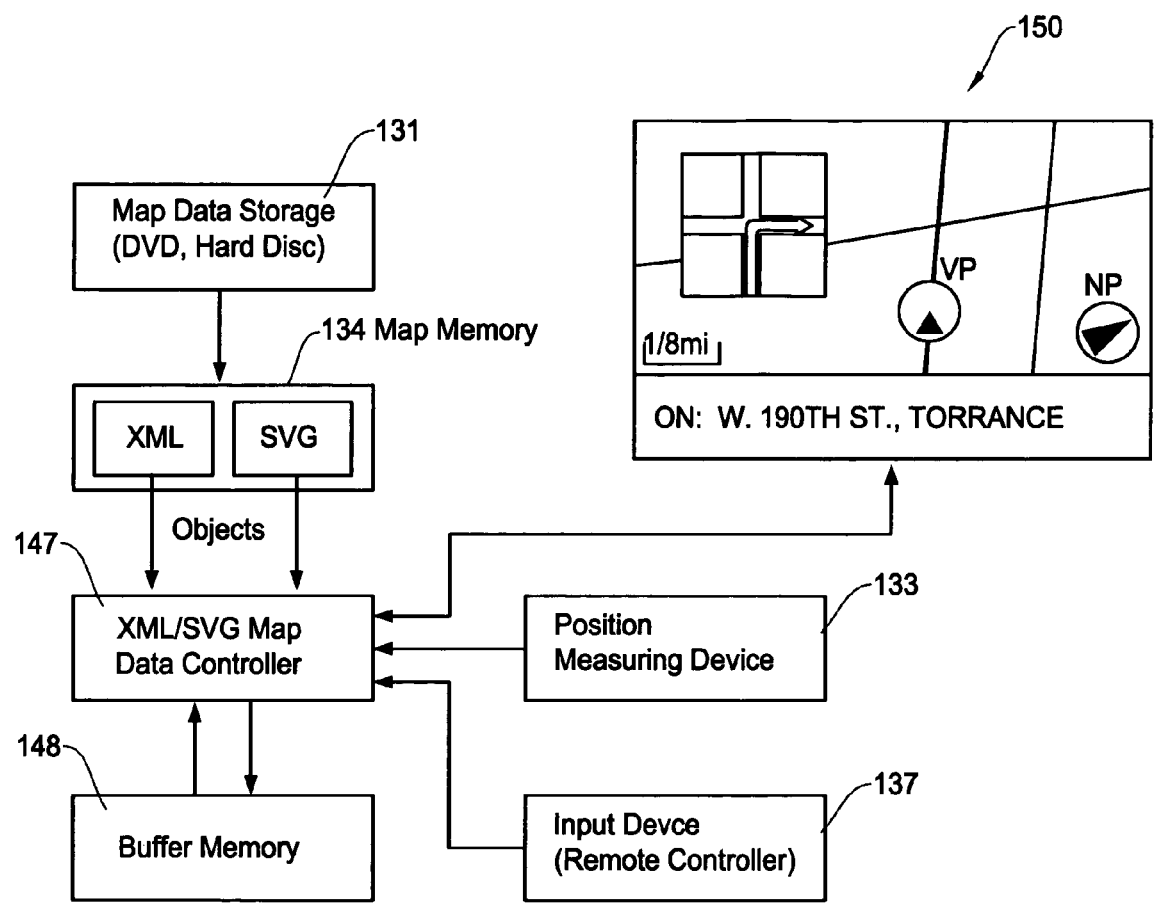
FIG. 20 is a functional block diagram showing a basic structure of an electronic device having a navigation function and implementing the present invention utilizing the XML map data and the spatial indexing method.

FIG. 20 is a functional block diagram showing an example of basic structure of an electronic device having a navigation function for utilizing the XML map data and its indexing method in accordance with the present invention. The structure of FIG. 20 is applicable to any electronic device having a navigation function which enables the electronic device to detect a current position of the user and guides the user to a destination as noted above. In FIG. 20, the components similar or identical to that in the block diagram of FIG. 21 for a vehicle navigation system are denoted by the same reference numbers.

The apparatus of the present invention includes a monitor 150 for interfacing with the user and displaying the information for the navigation operation in the text and image forms, an XML/SVG map data controller 147 for controlling an overall operation of the apparatus of the present invention. The block diagram of FIG. 20 further includes a map data storage 131 such as a DVD or a hard disc for storing the XML map data, a map memory 134 for storing the XML map data retrieved from the map data storage 131 as a unit of administrative jurisdiction, a position measuring device 133 which typically includes a GPS for detecting a current position of the user, an input device such as a keypad or a remote controller 137 for entering a destination, etc. by the user, and a buffer memory 148 for temporarily storing various types of data for processing and operation of the apparatus.

In FIG. 20, the apparatus of the present invention retrieves the XML map data from the map data storage 131 as a unit of administrative region, such as a city, as well as small map cells that divide the administrative region into smaller units. The spatial indexing method noted above is implemented to the XML map data by dividing the XML map data as unit of administrative region to a plurality of small map cells. Thus, typically, the map data storage 131 stores the XML format map data covering the whole country and the map memory 134 retrieves the map data covering a smaller area such as a city or an even smaller area by specifying the map cells depending upon, for example, the current location of the user or the specified destination. If the electronic device implementing the present invention has a communication capability either through wire or wireless, such XML map data can be retrieved from a remote data server as a unit of administration region.

The XML/SVG map data controller 147 performs an overall operation to create the map database in the map data storage 131 with the spatial indexes for map cells. The XML/SVG map data controller 147 checks whether the map data required for the navigation operation and for the interface with the user is either the text information or image information. The XML/SVG map data controller 147 retrieves the map data (object) from the XML database (map data storage) when the text information is required or from the SVG database when the image information is required.

As soon as a destination is specified by the user through the input device 137, the XML/SVG map data controller 47 controls the map memory 134 to store the XML map data retrieved from the map data storage 131. The XML map data controller 147 reads the XML map data from the map memory 134 and calculates a route to the destination. During the route guidance operation, the XML/SVG map data controller 147 controls the monitor screen 150 to display the calculated route, turn direction, etc., on the map image based on the current position detected by the position measuring (GPS) device 133. The monitor 150 also displays a road name, an estimated arrival time, etc. During the process of calculating the route and displaying the image and text information, the buffer memory 148 may be preferably used to temporarily store the necessary data.

FIG. 21 shows a structure of a vehicle navigation system for implementing the present invention. While the vehicle navigation system is explained for an illustration purpose, the present invention can also be applied to other types of navigation system. For example, the present invention can be applied to a portable navigation device implemented by a PDA (personal digital assistant) device, other hand-held devices such as a wireless telephone, or a laptop or notebook computer. The components similar or identical to that in the block diagram of FIG. 20 are denoted by the same reference numbers.

In the block diagram, the navigation system includes a map data storage 131 such as a CD-ROM, DVD, hard disc or other storage means for storing the map data in the XML/SVG format as well as spatial index data. The navigation system includes a storage control unit 132 for controlling an operation for reading the map information from the map data storage 31, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving GPS signals from satellites, and etc.

The block diagram of FIG. 21 further includes a map information memory 134 for storing the map information which is read from the map data storage 131, a database memory 135 for storing database information such as point of interest (POI) information which is read out from the map data storage 131, a remote controller 137 for executing a menu selection operation, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 21, the navigation system further includes a bus 136 for interfacing the above units in the system, a processor (CPU) 139 for controlling an overall operation of the navigation system, a ROM 140 for storing various control programs such as a route search program and a map matching program necessary for navigation control, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transmitter 149 for wireless communication to retrieve data from a remote server, a buffer memory 148 for temporally storing data for ease of data processing, and a monitor (display) 150.

An XML/SVG map data controller 147 controls the operation of the navigation system for utilizing the layered XML/SVG map data which is constructed on the basis of the administrative regions. In the conventional technology, as noted above, the map data of the selected area is divided into a plurality of cells (meshed portions). In the present invention, however, the XML/SVG format map data is constructed in a layered structure which is based on administrative regions such as states, counties, and cities. The XML/SVG map data controller 147 can be a separate processor or a part of CPU 139. The XML/SVG map data controller 147 performs the overall operation of the spatial indexing method of the present invention as described with reference to FIG. 20. The index data for the map cells divided according to the indexing method described above is stored in the map data storage 131.

As has been described above, according to the present invention, the method and apparatus efficiently assigns the spatial index numbers to the map cells that divide an area which is a unit of administrative region into a plurality of small units for a navigation system utilizing XML map data with a multi-layered structure. The index numbers for the map cells are assigned with a predetermined sequence created by combining two dimensional (X-Y) axis data into one dimensional data. The predetermined sequence includes the N-shape trace and U-shape trace for generating the sequence of the index numbers or address data with respect to the map cells. According to the present invention, the navigation system is able to efficiently index the plurality of small map cells that divide the XML map data in the unit of administrative region and retrieves the map data from the map cells. Since the XML map data is retrieved and processed as a unit of small map cell rather than a large unit of administrative region, the map data that is actually necessary is retrieved and processed by the limited resources of the navigation system, it is possible to significantly improve the operability and performance of the navigation system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of spatial indexing a plurality of map cells and retrieving map data from the map cells for a navigation system utilizing XML map data, comprising the following steps of:

establishing a plurality of map cells, each being in an XML format and having a square shape, for spatial indexing where the map cells divide an administrative region expressed by XML map data into small units where the XML map data is configured in a multiple-layered structure;

determining a layer in the multiple-layered structure of the XML map data on which the map cells are established for the spatial indexing;

selecting a type of tracing curve for sequentially indexing the plurality of map cells that divide the administrative regions, the tracing curve being created by combining X-address data and Y-address data of the map cells into one dimensional data;

assigning index numbers consecutively to all of the map cells in all of the layers of the XML map data with the sequence determined by the selected tracing curve, thereby creating a map database in the XML format with the spatial indexes for all of the map cells;

providing cost information on virtual links on layers higher than a base layer in the layered structure of the XML map data, where the virtual links are non-physical links formed by connecting boundary nodes located on boundaries of the administrative regions; and providing cost information on physical links on the base layer of the layered structure of the XML map data, where the physical links are links formed by connecting actual roads on the base layer;

wherein said tracing curve is adaptable to three dimensional curve representation for a given spatial sequence, and wherein said plurality of map cells divide a unit of administrative regions in all layers of the XML map data including a lowest layer thereof for indexing the map cells smaller than the administrative region in the lowest layer.

2. A method of spatial indexing and retrieving the map data as defined in claim 1, further comprising a step of selecting the map cells by generating address data that correspond to the index numbers assigned to the map cells for retrieving the XML map data from the map database.

3. A method of spatial indexing and retrieving the map data as defined in claim 1, wherein said sequence of the tracing curve for indexing the map cells is created by combining X-address data Xi and Y-address data Yi into one dimensional data (Xi, Yi).

4. A method of spatial indexing and retrieving the map data as defined in claim 1, further comprising a step of searching routes between a start point and a destination when the destination is specified by a user by selecting candidate virtual links that connect the boundary nodes of different administrative regions on a particular layer of the map data by evaluating the cost information on the virtual links.

5. A method of spatial indexing and retrieving the map data as defined in claim 4, wherein the cost information is computed based on a distance, a travel time, and predetermined cost space factors for each virtual link and physical link where the cost information on the virtual links on a particular layer is established on a layer of the map data that is immediately higher than the particular layer and stored in a form of cost tables.

6. A method of spatial indexing and retrieving the map data as defined in claim 1, wherein said administrative regions include cities, counties, states, and countries in the order of lower layer to higher layer in the layered structure of the XML map data.

7. A method of spatial indexing and retrieving the map data as defined in claim 6, wherein the layered structure of the XML map data is configured by an international layer for connecting the boundary nodes between two or more countries, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

\* \* \* \* \*